United States Patent
Gering

(10) Patent No.: US 12,498,423 B2
(45) Date of Patent: Dec. 16, 2025

(54) DETERMINING LITHIUM-METAL DEPOSITION AND RELATED AGING IN BATTERIES

(71) Applicant: Battelle Energy Alliance, LLC, Idaho Falls, ID (US)

(72) Inventor: Kevin L. Gering, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 862 days.

(21) Appl. No.: 17/654,931

(22) Filed: Mar. 15, 2022

(65) Prior Publication Data

US 2022/0299575 A1  Sep. 22, 2022

Related U.S. Application Data

(60) Provisional application No. 63/200,584, filed on Mar. 16, 2021, provisional application No. 63/200,556, filed on Mar. 15, 2021.

(51) Int. Cl.
*G01R 31/392* (2019.01)
*G01R 31/378* (2019.01)
*H02J 7/00* (2006.01)

(52) U.S. Cl.
CPC ......... *G01R 31/392* (2019.01); *G01R 31/378* (2019.01); *H02J 7/005* (2020.01); *H02J 7/00712* (2020.01)

(58) Field of Classification Search
None
See application file for complete search history.

(56) References Cited

U.S. PATENT DOCUMENTS

| | | |
|---|---|---|
| 8,346,495 B2 | 1/2013 | Gering |
| 8,467,984 B2 | 6/2013 | Gering |
| 8,521,497 B2 | 8/2013 | Gering |
| 9,625,532 B2 | 4/2017 | Gering |
| 2013/0030739 A1* | 1/2013 | Takahashi ............ G01R 31/392 702/63 |
| 2017/0203654 A1 | 7/2017 | He et al. |
| 2020/0136173 A1* | 4/2020 | Hong ................ H01M 10/0525 |

OTHER PUBLICATIONS

U.S. Appl. No. 62/705,611, filed Jul. 7, 2020, titled "Determining Effects From Transient Active Agents and Transient Events Upon Static or Semi-Static Populations", to Gering, 60 pages.

* cited by examiner

*Primary Examiner* — Jas A Sanghera
(74) *Attorney, Agent, or Firm* — TraskBritt

(57) ABSTRACT

Embodiments disclosed herein include a device including a lithium-ion battery and a battery-management system. The battery-management system may be configured to measure charge states of the lithium-ion battery over a number of charging cycles at specified conditions. The battery-management system may also be configured to obtain an expression for lithium-metal-deposition (LMD)-based capacity fade. The battery-management system may also be configured to determine an LMD state of the lithium-ion battery responsive to a comparison between the measured charge states and the expression. Related devices and systems are also disclosed herein. Additional embodiments are directed to methods, systems, and/or devices configured to generate an expression for LMD-based capacity fade.

20 Claims, 18 Drawing Sheets

DETERMINING LITHIUM-METAL DEPOSITION AND RELATED AGING IN BATTERIES

CROSS-REFERENCE TO RELATED APPLICATIONS

This application claims the benefit under 35 U.S.C. § 119(e) of U.S. Provisional Patent Application Ser. No. 63/200,556, filed Mar. 15, 2021, and U.S. Provisional Patent Application Ser. No. 63/200,584, filed Mar. 16, 2021, the disclosure of each of which is hereby incorporated in its entirety herein by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

Embodiments of the present disclosure relate to determining lithium-metal deposition and/or related aging in batteries, e.g., lithium-ion batteries and lithium-metal batteries.

BACKGROUND

A battery converts stored chemical energy to electrical energy, which may be conveyed as a voltage potential. Rechargeable batteries may be charged and depleted multiple times. As a rechargeable battery ages, the storage capacity and conductance of the rechargeable battery may decrease (i.e., fade) between a Beginning of Life (BOL) and an End of Life (EOL). Over the service life of the rechargeable battery, certain performance characteristics may experience losses, such as capacity fade (loss) and power loss, among others.

BRIEF SUMMARY

Embodiments disclosed herein include methods, systems and/or devices configured to determine lithium-metal deposition (or, plating) in a battery. Some embodiments include a device including a lithium-ion battery and a battery-management system. The battery-management system may be configured to measure charge states of the lithium-ion battery over a number of charging cycles. The battery-management system may also be configured to obtain an expression for lithium-metal-deposition-based (LMD-based) capacity fade. The battery-management system may also be configured to determine an LMD state of the lithium-ion battery based on a comparison between the measured charge states and the expression.

Additional embodiments include a method including obtaining data samples indicative of capacity of a battery over a number of complete cycles. The method may also include obtaining charging data indicative of conditions of the number of complete cycles. The method may also include obtaining an expression for LMD-based capacity fade. The method may also include determining an LMD state of the battery based on a comparison between the data samples, the charging data, and the expression.

Additional embodiments are directed to methods, systems, and/or devices configured to generate an expression for LMD-based capacity fade. Some embodiments include a method including obtaining a baseline capacity-loss data set for a battery. The method may also include, based on the baseline capacity-loss data set, generating a first expression for baseline capacity loss. The method may also include obtaining an LMD-based capacity-loss data set representative of LMD in the battery. The method may also include, based on the LMD-based capacity-loss data set, generating a second expression for LMD-based capacity loss. The method may also include, based on the first expression and the second expression, generating a third expression indicative of total capacity loss for the battery.

Each of FIGS. 4-7 is a graph illustrating capacity-fade data of a respective lithium-ion cell, the capacity-fade analysis data obtained according to one or more embodiments of the present disclosure.

Figure 8:
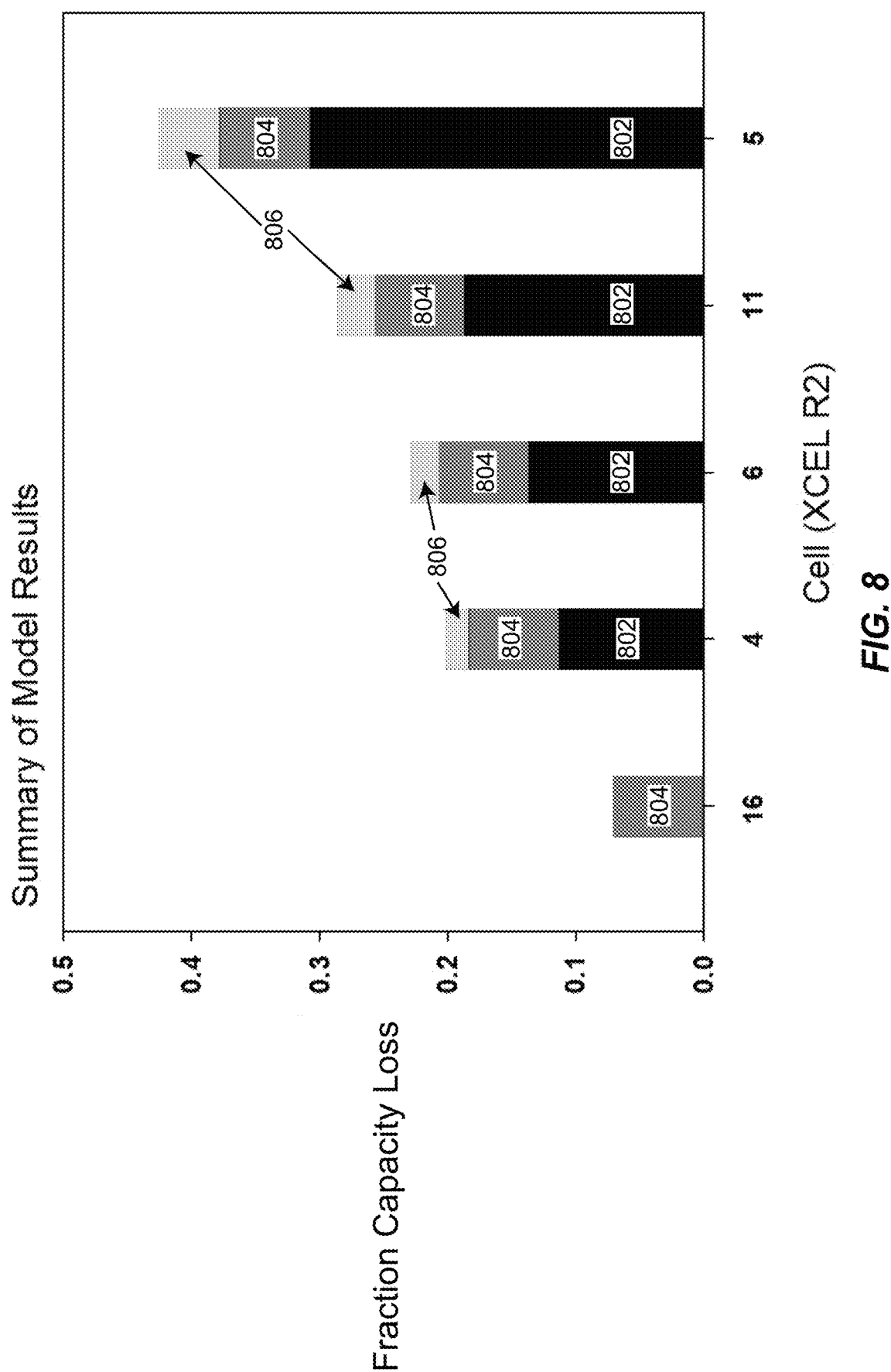

FIG. 8 is a bar graph illustrating modeled data of fractions of capacity losses due to different causes, the modeled data obtained according to one or more embodiments of the present disclosure.

Figure 9:
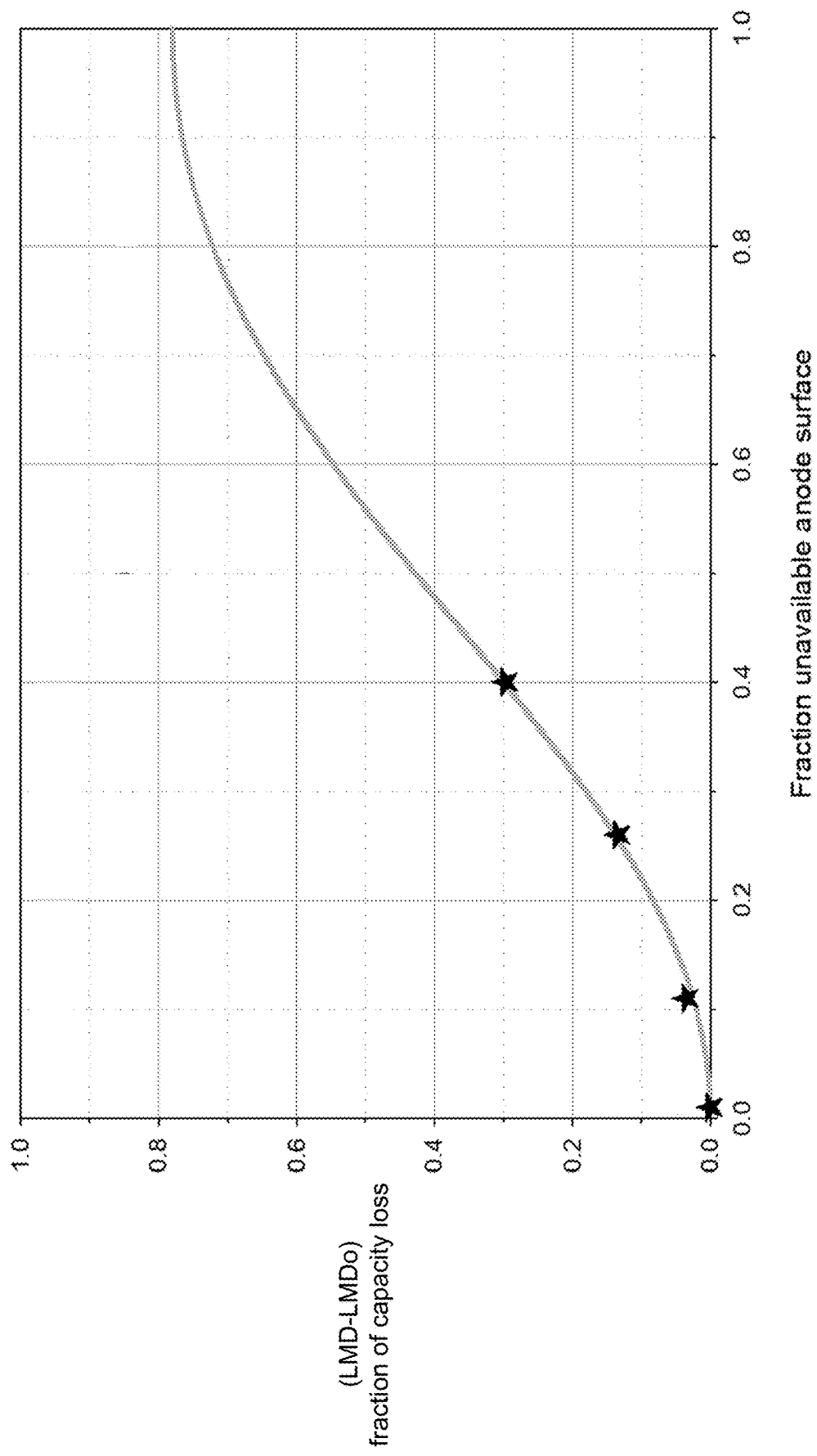

FIG. 9 is a graph illustrating modeled data of capacity loss due to LMD as a function of fraction of unavailable anode surface, the modeled data obtained according to one or more embodiments of the present disclosure.

Figure 10:
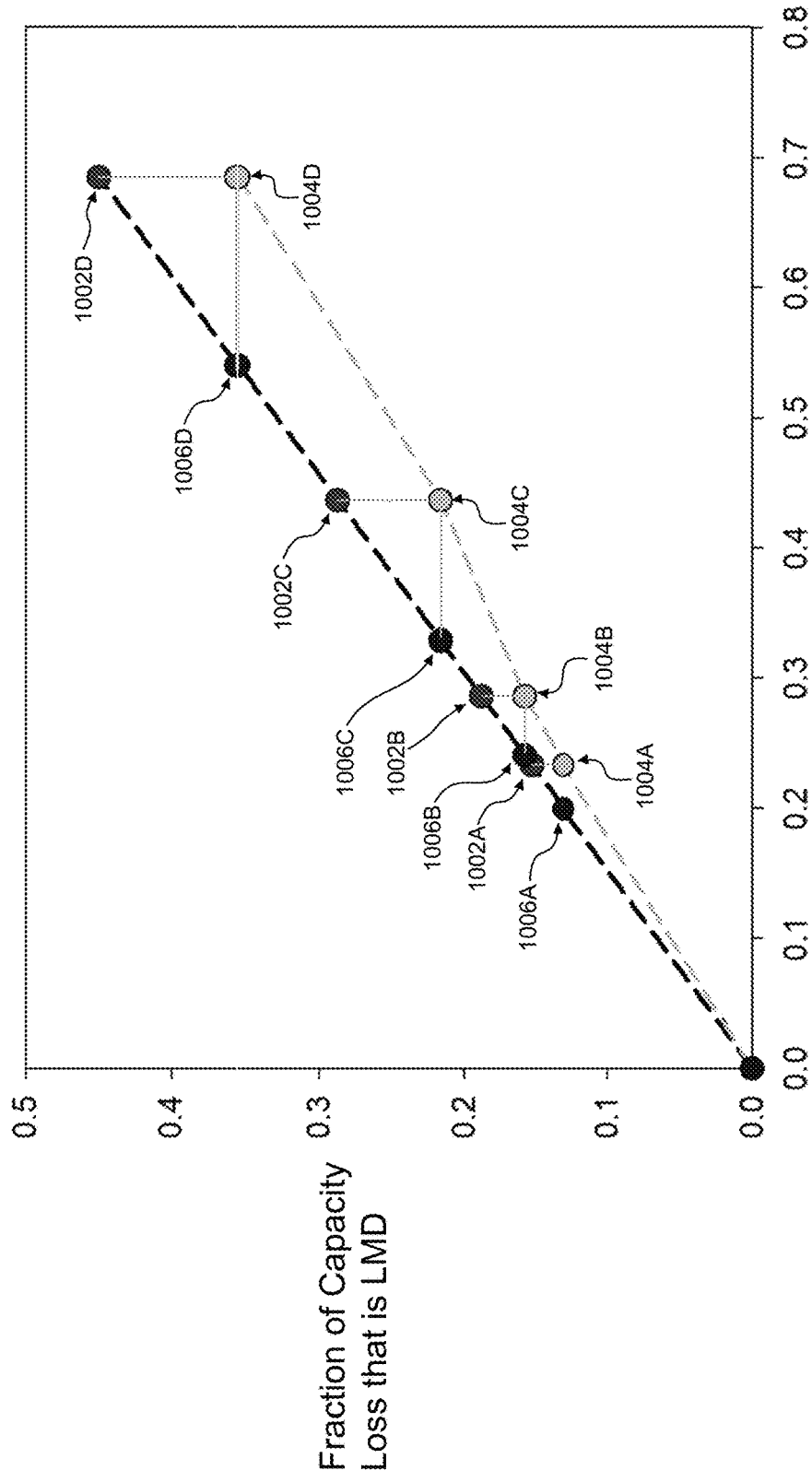

FIG. 10 is a graph illustrating evaluations of LMD models as a function of affected anode area and LMD dissipation, the LMD models according to one or more embodiments of the present disclosure.

Figure 11:
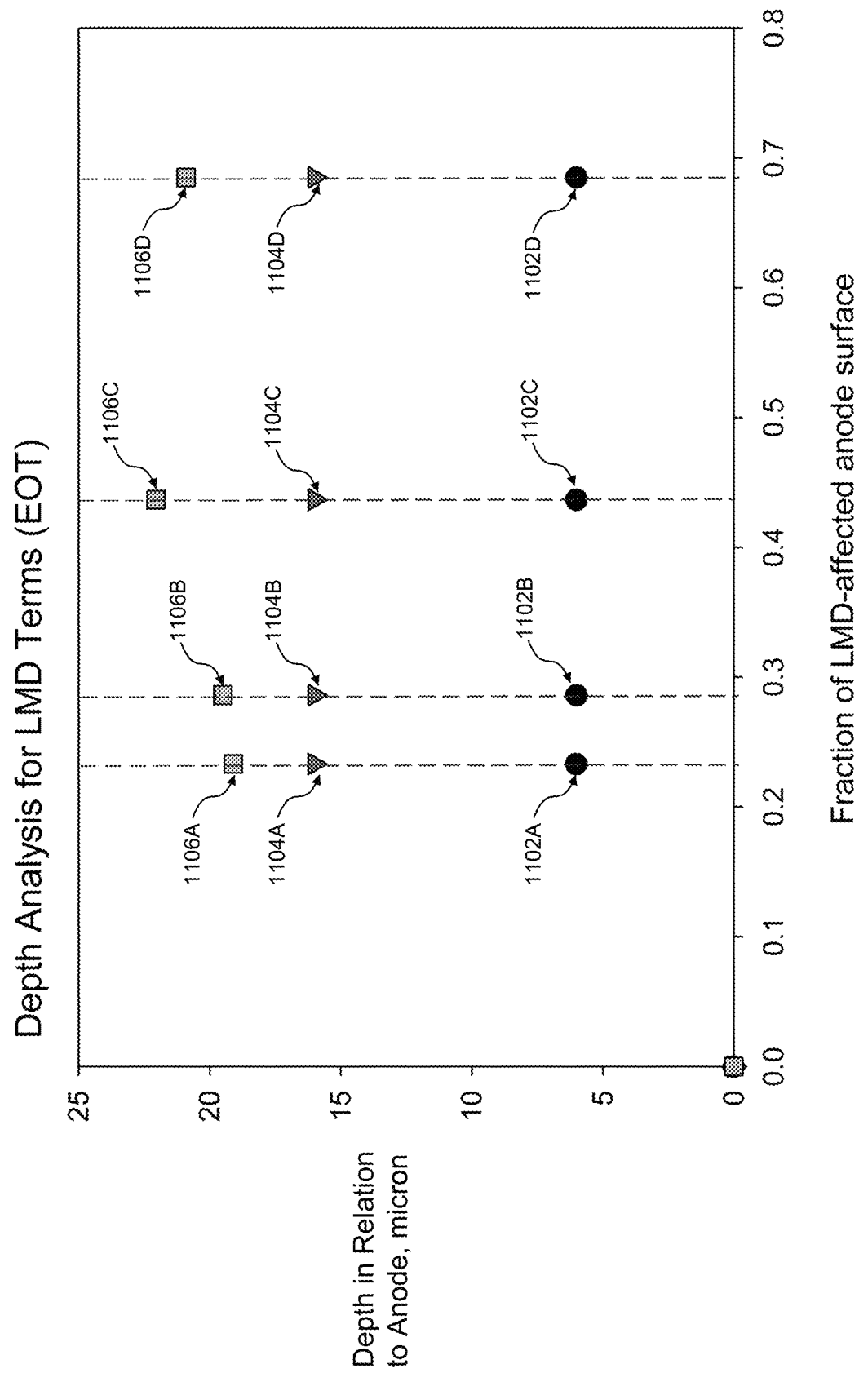

FIG. 11 illustrates modeled data indicative of depth (thickness) of LMD on an anode, the modeled data obtained according to one or more embodiments of the present disclosure.

Figure 12A:
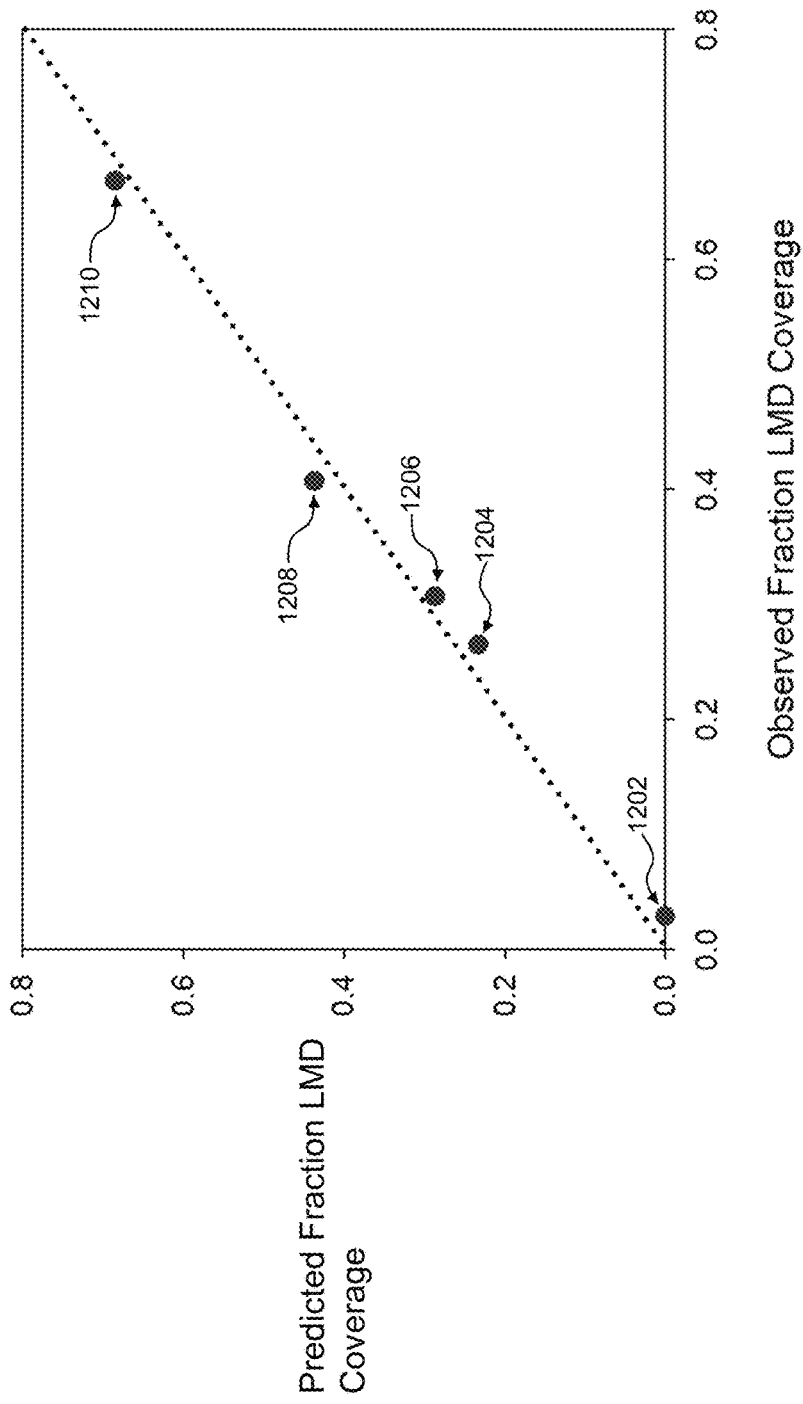

FIG. 12A illustrates a relationship between predicted fraction of LMD coverage and observed fraction of LMD coverage, the predicted fraction of LMD coverage obtained according to one or more embodiments of the present disclosure, the observed fraction of LMD coverage as observed using photographic analysis.

Figure 12B:
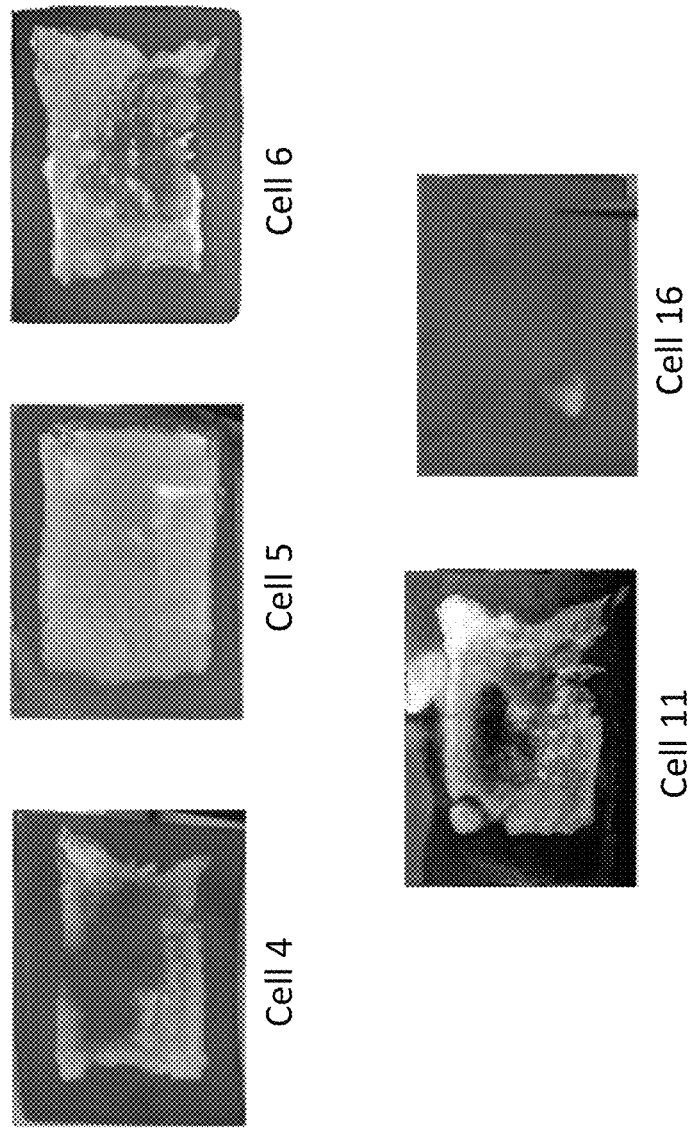

FIG. 12B includes images of lithium-metal deposition on a graphite-based anode of a lithium-ion battery, the lithium-ion batteries corresponding to the data of FIG. 12A.

Figure 13:
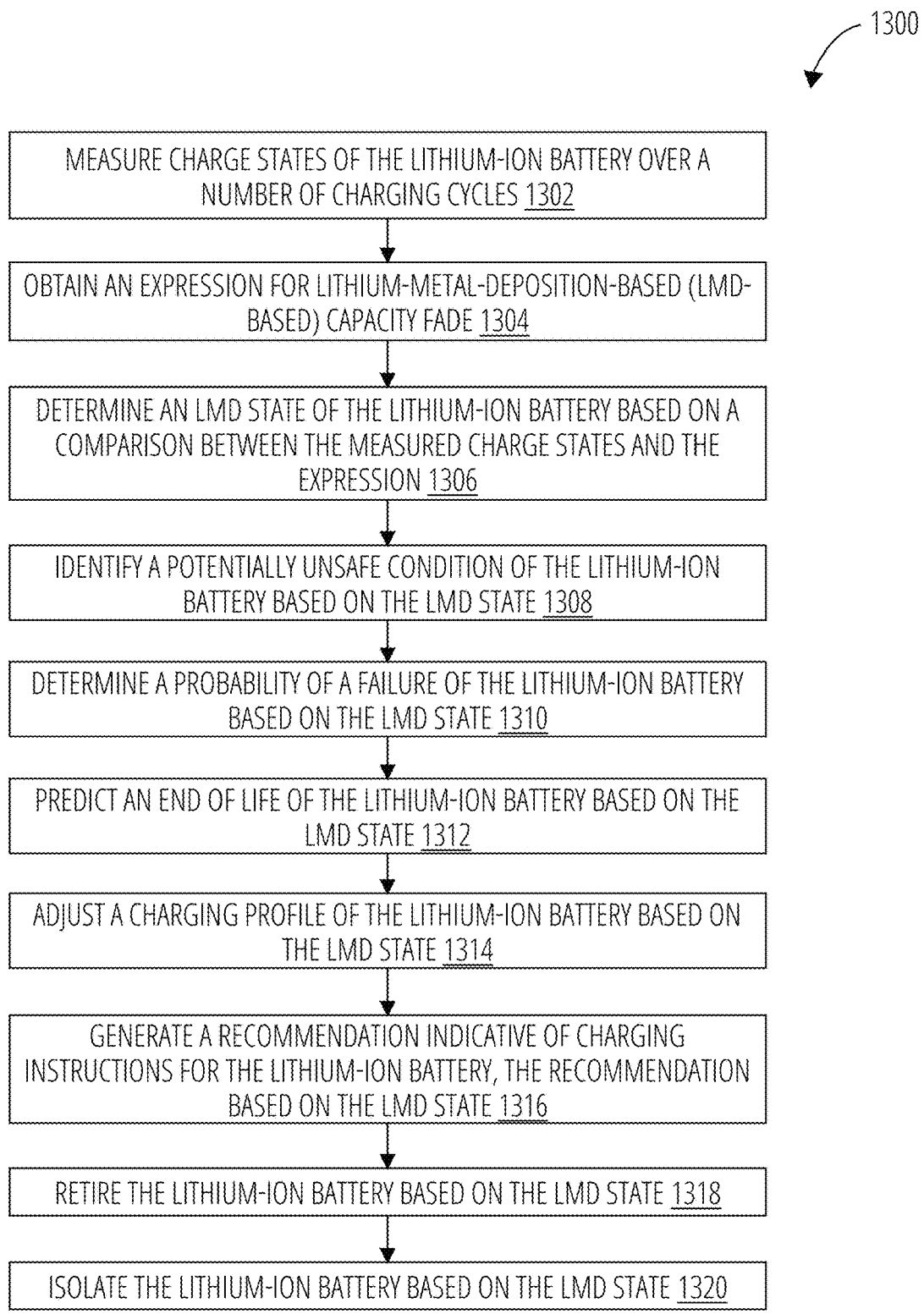

FIG. 13 is a flowchart of an example method, in accordance with various embodiments of the disclosure.

Figure 14:
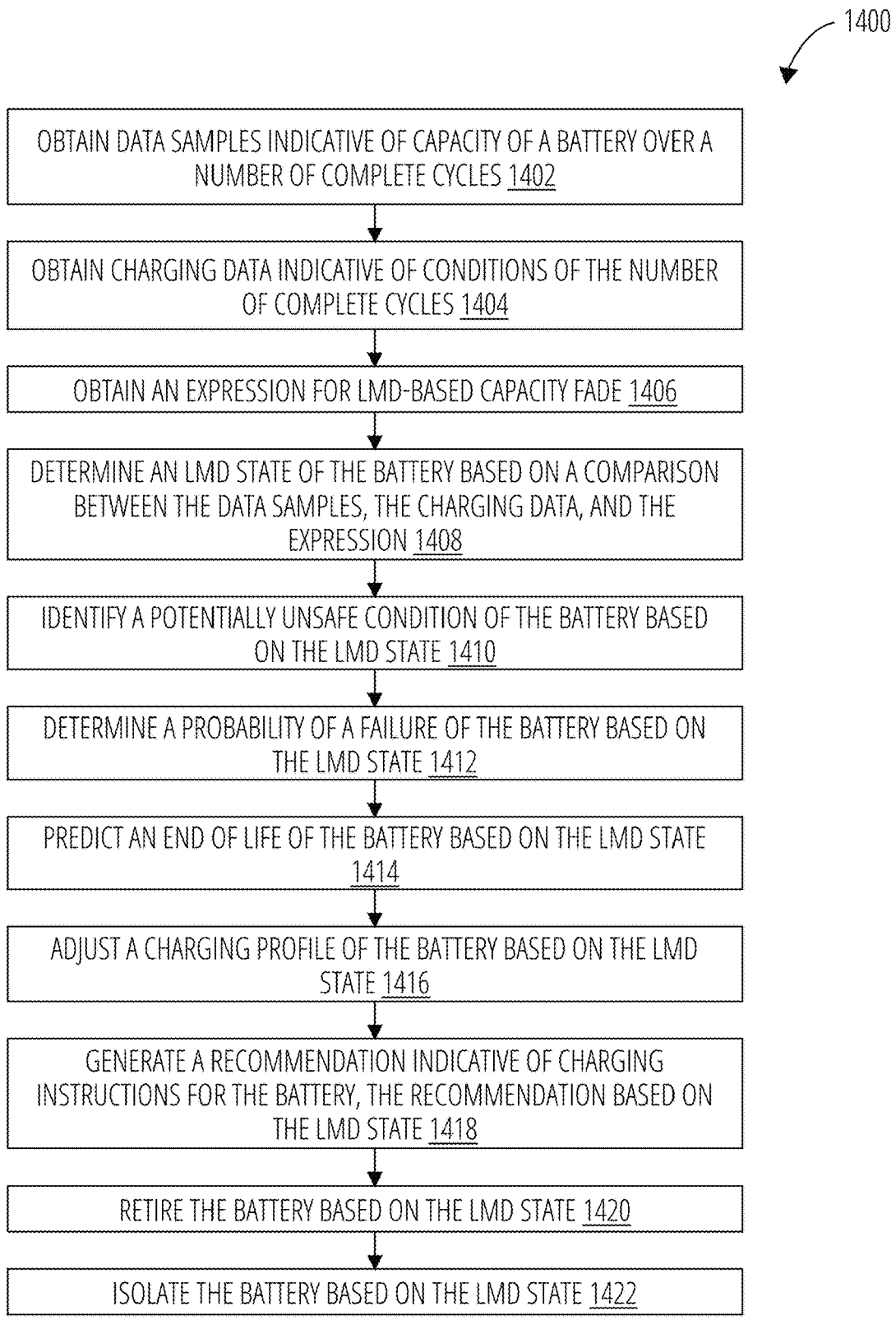

FIG. 14 is a flowchart of an example method, in accordance with various embodiments of the disclosure.

Figure 15:
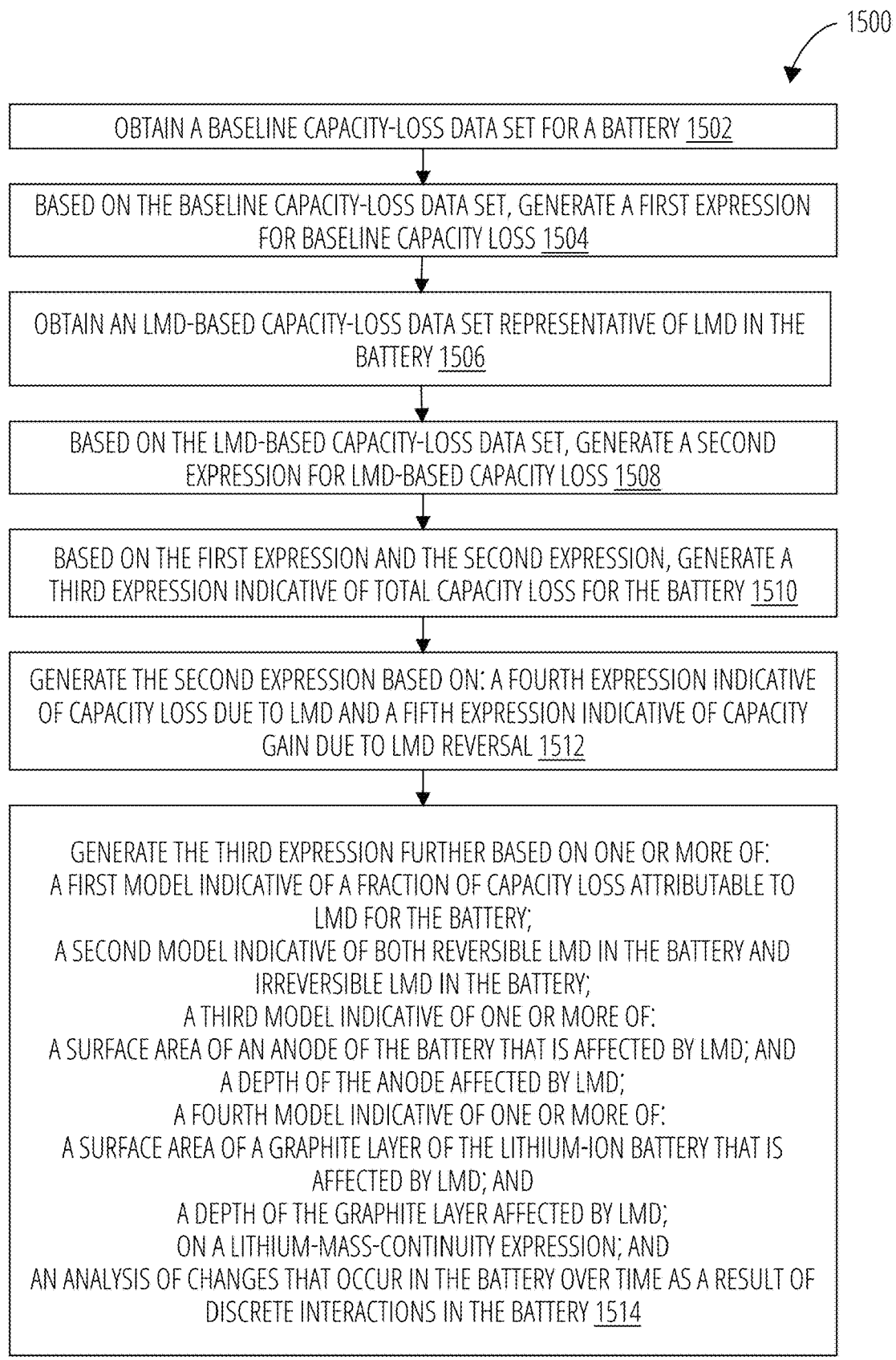

FIG. 15 is a flowchart of an example method, in accordance with various embodiments of the disclosure.

Figure 16:
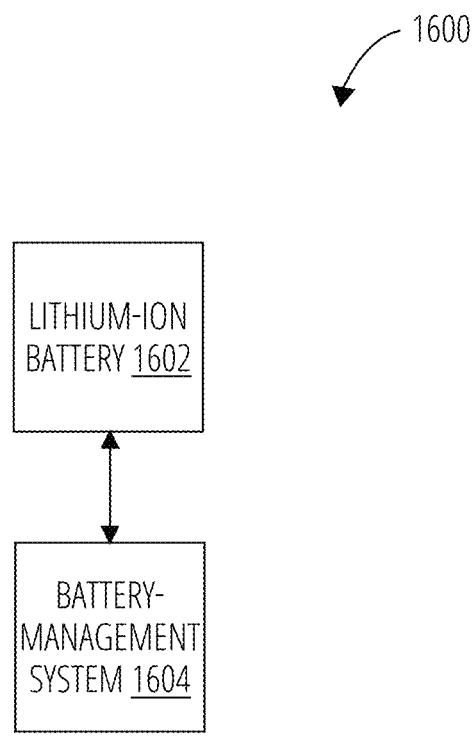

FIG. 16 illustrates a block diagram of an example device that may be used to implement various functions, operations, acts, processes, and/or methods, in accordance with one or more embodiments.

Figure 17:
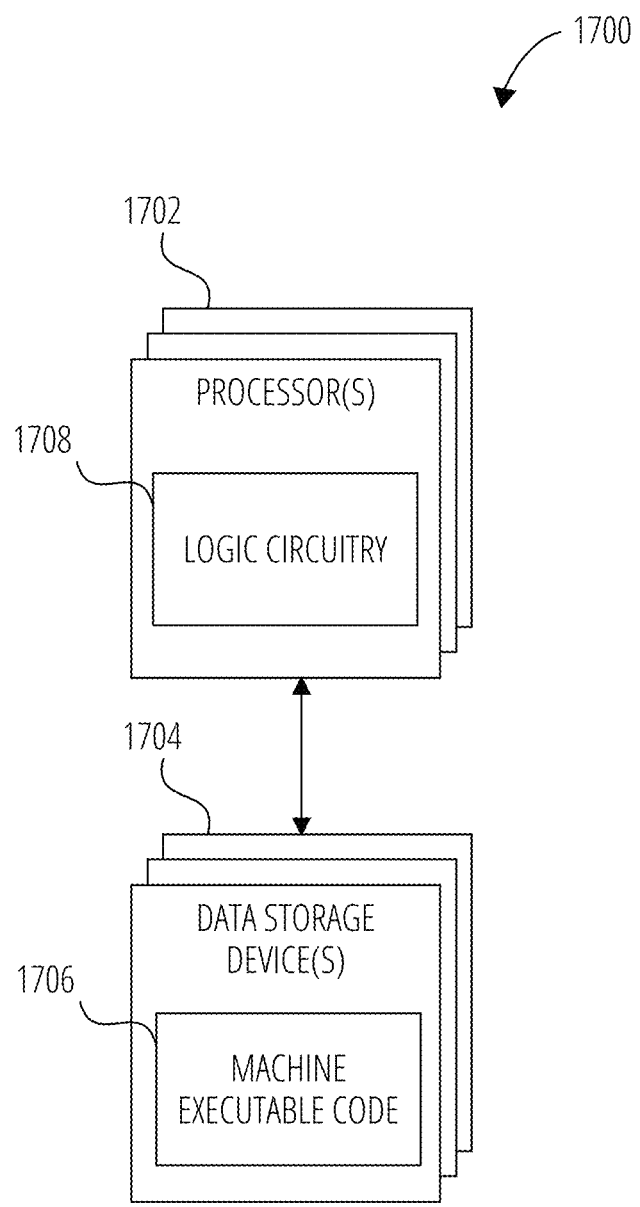

FIG. 17 illustrates a block diagram of an example device that may be used to implement various functions, operations, acts, processes, and/or methods, in accordance with one or more embodiments.

DETAILED DESCRIPTION

In the following detailed description, reference is made to the accompanying drawings, which form a part hereof, and in which are shown, by way of illustration, specific embodiments of the disclosure that may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, specific implementations are shown and described only as examples and should not be construed as the only way to implement the present disclosure unless specified otherwise herein. It will be readily apparent to one of ordinary skill in the art that the various embodiments of the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Referring in general to the following description and accompanying drawings, various embodiments of the present disclosure are illustrated to show their structure and method of operation. Common elements of the illustrated embodiments may be designated with similar reference numerals. It should be understood that the figures presented are not meant to be illustrative of actual views of any particular portion of the actual structure or method, but are merely idealized representations employed to more clearly and fully depict the present invention defined by the claims below.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the embodiments of the present disclosure may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the general-processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

When executed as firmware or software, the instructions for performing the processes described herein may be stored on a computer-readable medium. A computer-readable medium includes, but is not limited to, non-transitory storage media, such as magnetic and optical storage devices such as disk drives, magnetic tape, CDs (compact disks), DVDs (digital versatile discs or digital video discs), and semiconductor devices such as RAM, DRAM, ROM, EPROM, and Flash memory.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Modern battery systems are being tasked to perform at higher levels in terms of increased total energy storage, greater power delivery, and reduced charge time. Such challenging targets can have consequences that reduce the effective life of individual battery cells and the assembled packs wherein they operate.

Lithium-metal deposition (LMD) is an undesirable outcome in batteries, e.g., in lithium-ion and lithium metal cells with graphitic anodes. LMD may include lithium ions depositing on a surface of an anode, whereupon they are reductively converted to lithium metal. LMD may result in an unsafe condition, e.g., lithium dendrite formation that may result in catastrophic cell failure through rapid self-discharging. LMD may be influenced by how a battery is cycled (e.g., charged and/or discharged). For example, LMD may be caused by or affected by charging at excessive rates and/or at low temperatures.

Figure 1:
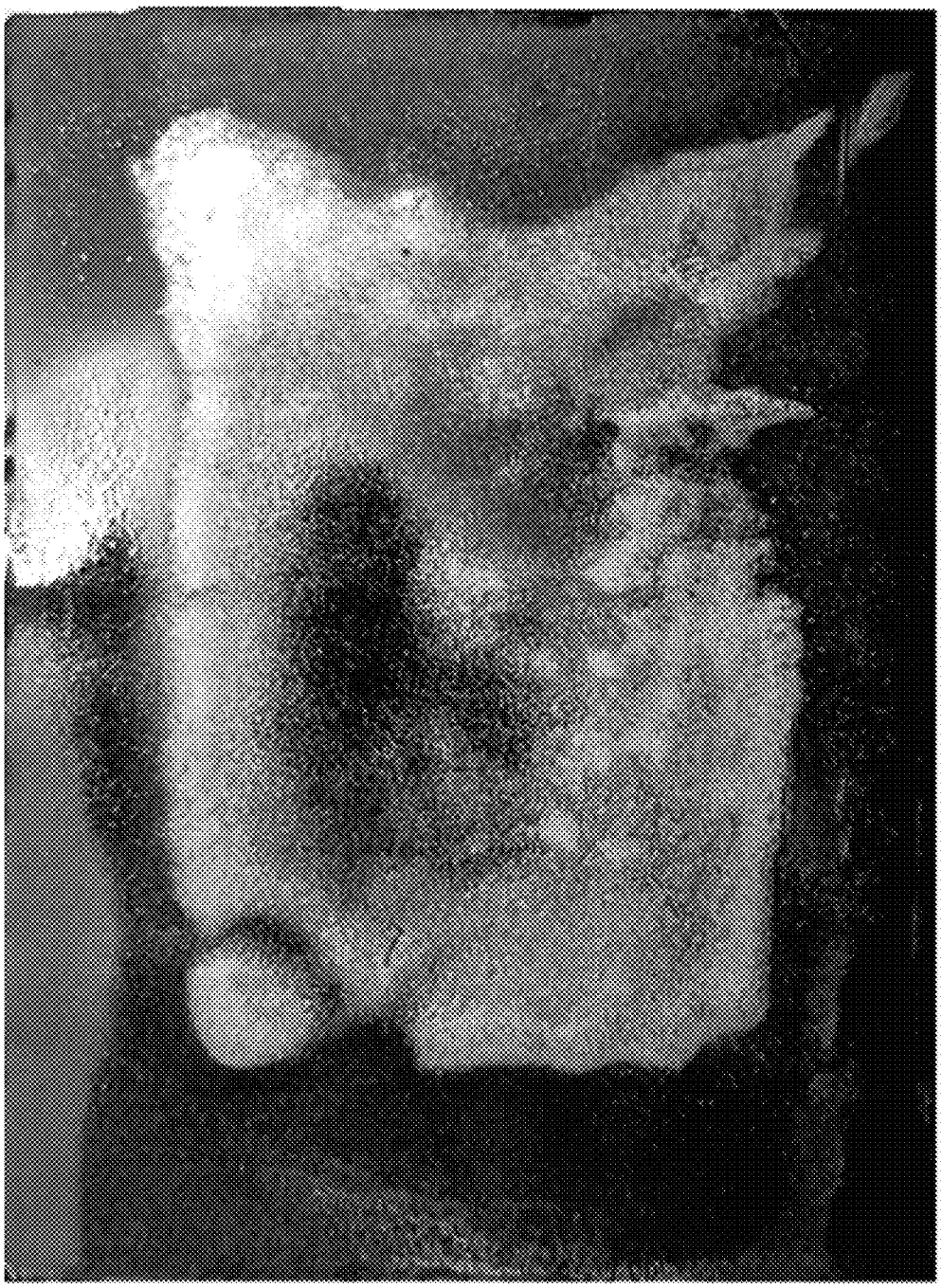
FIG. 1 is a black-and-white image of a lithium-metal deposition on a graphite-based anode of a lithium-ion battery.

FIG. 1 is a black-and-white image of a lithium-metal deposition on a graphite-based anode of a lithium-ion battery. In FIG. 1, the dark regions are the pristine graphite surface and the light regions are deposited lithium metal. The image was obtained using common photographic analysis. The anode exhibits LMD as evidenced by the lighter regions.

Figure 2:
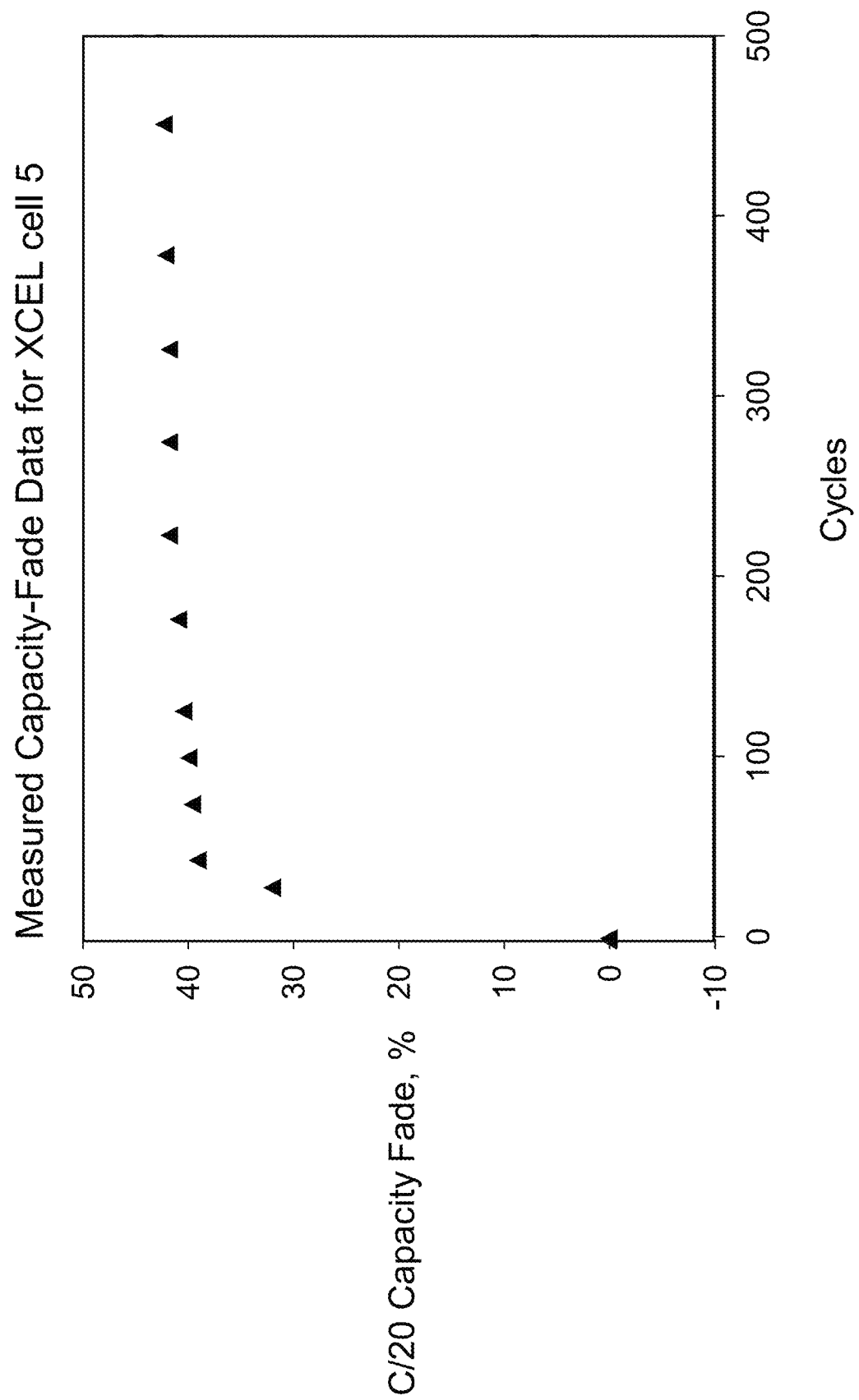
FIG. 2 is a graph illustrating capacity fade of a battery caused, at least in part, by lithium-metal deposition in the battery.

FIG. 2 is a graph illustrating capacity fade of a battery caused, at least in part, by lithium-metal deposition in the battery. The C/20 notation refers to a condition of discharging a full cell at maximum voltage to a fully empty state at minimum voltage over the span of 20 hours by using a small constant discharge current. The C/20 rate is used as a non-limiting example; other discharge rates (e.g., C/10, C/3 etc.) used with other voltage brackets can also be applied to elucidate capacity fade in a battery. From FIG. 2 it can be seen that the capacity of the battery decreases with an increase in a number of charging cycles the battery is subjected to. At least some of this capacity fade is a direct result of LMD.

Systems, methods, and/or devices of the present disclosure may determine LMD. For example, systems, methods, and/or devices of the present disclosure may quantify LMD in a battery, a degree to which LMD is affecting performance of the battery, and/or a risk of failure of the battery related to LMD. Systems, methods, and/or devices of the present disclosure include a modeling method by which metrics of LMD are predicted and quantified as they relate to cell capacity loss over time.

By determining LMD, the systems, methods, and/or devices of the present disclosure can create a more accurate expression (or model) of capacity fade than is possible without determining LMD. In particular, by determining LMD, and including expressions accounting for LMD in an expression (or model) of total capacity fade, the resulting model will be more accurate than other expressions (or models) of capacity fade that do not directly account for LMD.

Benefits of the systems, methods, and/or devices of the present disclosure bear directly on battery research and consumer or industrial applications. At least one embodiment of the present disclosure includes an implementable technique to detect the presence of LMD and/or quantify LMD so that timely actions can be taken, e.g., by the battery end-user or a battery management system (BMS), to avoid unsafe conditions. For example, a BMS may alter how a battery is being charged to reverse or decrease LMD or decrease a rate of LMD growth. As another example, a BMS may inform a user of LMD and instruct a user how to alter usage and/or charging to reverse or decrease LMD. As another example, a BMS may warn a user of LMD and/or of a risk of failure of a battery. As another example, a BMS may retire or isolate a cell or instruct a user to retire or isolate a cell in response to a determined risk of failure.

At least some embodiments of the present disclosure include a succinct yet highly targeted method to derive important LMD metrics based on test data, models, and a combination thereof. The modeling basis stems from robust sigmoidal rate expressions and other mass continuity governing expressions that allow quantification of LMD-related quantities. Some embodiments of the present disclosure give the ability to estimate the prevalence of LMD in a chosen lithium battery type, which supports early detection and mitigation of problematic and unsafe LMD conditions.

The systems, methods, and/or devices of the present disclosure may be implemented as a stand-alone capability or within a larger system, e.g., a BMS. The stand-alone capability and/or the larger system may be implemented in any environment including rechargeable batteries. For example, a BMS on a phone, a personal computing device, or a car may be configured to implement methods of the present disclosure and/or to include systems and/or devices of the present disclosure. As another example, a power utility may implement devices, systems, or/or methods of the present disclosure in an electrical grid-based battery energy storage system.

Further, the systems, methods, and/or devices of the present disclosure may be part of a larger system of battery analysis, modeling and/or management. The systems, methods, and/or devices of the present disclosure can be used as an independent yet complementary route to existing physics-based tools (e.g., CellSage tools, provided by Idaho National Labs, of Idaho Falls, ID) to diagnose and predict aging processes in battery applications.

One advantage of the systems, methods, and/or devices of the present disclosure is the depth of scientific and mathematical rigor that underlies them. The systems, methods, and/or devices of the present disclosure build on the proven approach by the CellSage documents that have their foundation in physics, thermodynamics, and kinetic processes. The modeling approach in the systems, methods, and/or devices of the present disclosure is accurate, owing to direct analytical mathematical solutions and modeling of LMD. Further, the approach gives insights into how conditions of use and charging give rise to degradation mechanisms, e.g., LMD-based degradation. It is also robust due to the numerous battery parameters and their combinations that can be considered. It also can support battery management actions to help batteries last longer.

There have been efforts to analyze battery aging. Among these efforts are: U.S. application Ser. No. 12/571,253 titled "Systems, Methods and Computer Readable Media for Estimating Capacity Loss in Rechargeable Electrochemical Cells," which issued as U.S. Pat. No. 8,467,984; U.S. application Ser. No. 12/765,384 titled "Systems, Methods and Computer-Readable Media to Model Kinetic Performance of Rechargeable Electrochemical Devices," which issued as U.S. Pat. No. 8,346,495; U.S. application Ser. No. 12/793,224 titled "Systems, Methods and Computer-Readable Media for Modeling Cell Performance Fade of Rechargeable Electrochemical Devices," which issued as U.S. Pat. No. 8,521,497; U.S. application Ser. No. 13/598,290 titled "Method, System, and Computer-Readable Medium for Determining Performance Characteristics of an Object Undergoing One or More Arbitrary Aging Conditions," which issued as U.S. Pat. No. 9,625,532; and U.S. Application No. 62/705,611 titled "Determining Effects from Transient Active Agents and Transient Events upon Static or Semi-Static Populations." The disclosure of each of the foregoing documents is hereby incorporated herein by reference in its entirety. The foregoing documents are referred to collectively herein as "the CellSage documents."

In some embodiments, datasets are identified to evaluate the capacity loss trends of lithium-ion cells in terms of a baseline (BL) condition. The BL condition may be a condition including a charge rate that does not produce LMD at the anode. In some embodiments, data from periodic reference performance tests (RPTs) may be used. In some embodiments, other RPT datasets may be utilized e.g., RPT datasets from cells that were operated at higher charge rates than the BL, which may produce LMD in many cases. In some embodiments, sigmoidal rate expressions (SREs) are employed with the data to describe the baseline electrode passivation (SEI/CEI) contributions to capacity loss, the maximum LMD contributions to capacity loss, and the LMD dissipation (lithium re-equilibration from LMD to lithium ions or atoms) contributions to capacity loss, all as a function of cycle count. In some embodiments, additional governing expressions allow quantification of trapped graphite below the LMD, as well as the thicknesses of the affected layers: LMD before and after dissipation (giving reversible and irreversible LMD), and the trapped graphite within the anode. Various embodiments disclosed herein may serve as a connection between available/usable anode surface area and the extent of LMD as a fraction of anode surface coverage by LMD. Various embodiments disclosed herein may be extended to lithium-metal cells, covering aspects of capacity loss due to lithium metal separation/isolation and increased loss due to further SEI progression. Additionally or alternatively, this approach could be extended to non-lithium batteries (e.g., magnesium, nickel or zinc).

The following is an example of a sigmoidal rate expression:

$$\psi(j, i^*, t) = \left\{ (1 - \theta_r(j, i^*)) \stackrel{!}{=} M'_j + 2(M_j - M'_j) \left[ \frac{1}{2} - \frac{1}{1 + \exp\left((a_j t)^{b_j}\right)} \right] \right\}$$

where $\psi(j, i^*, t)$ is a battery health metric such as fraction of capacity loss due to mechanism 'j' for arbitrary operating condition 'i*' over independent variable time 't.' Alternatively, another independent variable that is a function of time can be used in place of time, such as the number of completed battery cycles over time. Herein, the SRE parameters (a,b,M) are physical parameters representing chemical kinetic and thermodynamic terms (rate constant, order of reaction, and maximum extent of degradation, respectively) for the given j mechanism. The term $M'_j$ represents a possible initial state of aging that is non-zero, i.e., if new testing was done on a battery with a previous aging history. Lastly, $\theta_r(j,i^*)$ represents the fraction of remaining useful battery capacity.

Figure 3:
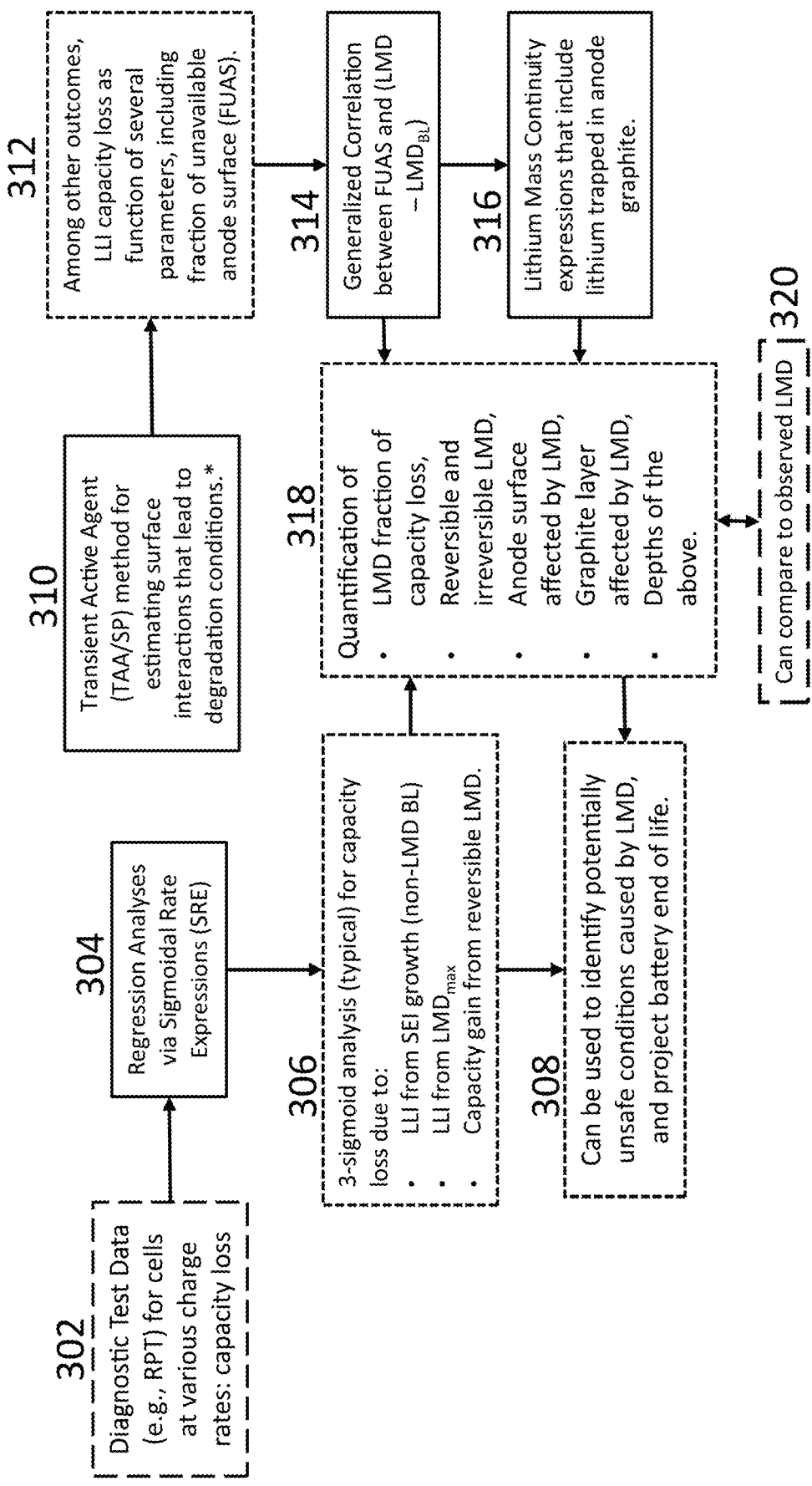
FIG. 3 is a functional block diagram illustrating several aspects of systems, methods, and/or devices of the present.

FIG. 3 is a functional block diagram illustrating several aspects of systems, methods, and/or devices of the present disclosure. Elements of FIG. 3 that are illustrated using solid lines represent model elements. Elements of FIG. 3 that are illustrated using dashed broken lines represent test data. Elements of FIG. 3 that are illustrated using dotted broken lines illustrate outcomes (e.g., outcomes of operations performed by model elements).

For example, FIG. 3 illustrates diagnostic test data 302 (e.g., RPT) that may include diagnostic test data for a cell or cells (e.g., battery cells) at various charge rates. Diagnostic test data 302 may include data indicative of capacity loss. (For example, data illustrated by FIGS. 4-7 may include an example of diagnostic test data 302.) Diagnostic test data 302 may be obtained from RPTs. Diagnostic test data 302 may include data from a cell under test (e.g., having its LMD determined) and data from cells that share characteristics with the cell under test. For example, the diagnostic test data 302 maybe include data from one or more cells identical to, or similar to, the cell under test. In particular, diagnostic test data 302 may include data from cells that do not exhibit detectable LMD (e.g., baseline data) and data from cells that exhibit more LMD.

FIG. 3 further illustrates regression analysis block 304. At regression analysis block 304, a regression analysis via SREs may be performed on diagnostic test data 302. For example, through regression analysis, one or more SREs may be generated indicative of capacity loss due to LMD and one or more SREs may be generated indicative of non-LMD-based capacity loss.

Regression analysis block 304 may produce sigmoidal analysis 306. Sigmoidal analysis 306 may include three or more expressions (or data sets) related to the diagnostic test data 302. For example, the sigmoidal analysis 306 may include: a baseline expression representative of capacity loss over charging cycles that is not related to LMD (e.g., loss of lithium inventory (LLI) from SEI growth (non-LMD BL)), an LMD expression representative of capacity loss due to LMD (e.g., LLI from $LMD_{max}$), and a LMD-reversal expression representative of capacity gains due to partial reversal of LMD to lithium ions or atoms (e.g., capacity gain from reversible LMD). Data illustrated in FIGS. 4-7 may include examples of each of these expressions.

Additionally, FIG. 3 illustrates Transient Active Agent/Static Population (TAA/SP) method block 310. More information regarding TAA method block 310 can be found in U.S. Application No. 62/705,611 titled "Determining Effects from Transient Active Agents and Transient Events upon Static or Semi-Static Populations" which is incorporated herein in its entirety by reference. TAA method block 310 may include an analysis of interactions occurring within the cell or cells from which the diagnostic test data 302 was obtained (e.g., the cell under test as well as identical cells).

Results from TAA method block 310 may facilitate, among other things, a function for determining a LLI capacity loss 312. LLI capacity loss 312 may include a function describing capacity loss due to LLI as a function of several parameters, including the fraction of unavailable anode surface (FUAS), as demonstrated in FIG. 9.

At correlation block 314, the LLI capacity loss 312 may be correlated with capacity loss observed at the cell or cells from which the diagnostic test data 302 was obtained. For example, LLI capacity loss 312 may be correlated with one or more data sets of sigmoidal analysis 306 and/or RPT date of the cell under test. As a specific example, net capacity loss (e.g., the LMD data set minus the LMD-reversal data sets of sigmoidal analysis 306 ($LMD-LMD_{BL}$)) may be correlated with LLI capacity loss 312 as a function of FUAS to infer information regarding lithium in the cell or cells. In particular, at correlation block 314, information regarding: free vs. trapped lithium and FUAS, may be determined. Additionally or alternatively, correlation block 314 may correlate FUAS and $LMD-LMD_{BL}$.

At continuity block 316, additional information regarding lithium in the cell or cells may be determined. In particular, using lithium-mass continuity expressions that include lithium trapped in anode graphite, inferences about the location and form of lithium in the cell are made. For example, based on the lithium-mass continuity expression, an amount of lithium trapped at the anode may be determined, for example, lithium trapped as irreversible LMD or as trapped within a portion of the graphitic anode material.

Quantification block 318 includes data regarding the cell or cells determined at each of regression analysis block 304, TAA method block 310, correlation block 314, and continuity block 316. Also, quantification block 318 includes data obtained by combining results from each of regression analysis block 304, TAA method block 310, correlation block 314, and continuity block 316. Quantification block 318 may include data regarding one or more of: a fraction of capacity loss of the cell or cells attributable to LMD (LMD fraction of capacity loss), an amount or fraction of LMD that is reversible as compared with a fraction of LMD that irreversible (reversible and irreversible LMD), an amount or fraction of the surface of the anode of the cell or cells affected by LMD (anode surface affected by LMD), a depth of the anode affected by LMD, a thickness of LMD on the anode, an amount or fraction of a graphite layer of the cell or cells affected by LMD (graphite layer affected by LMD), a depth of the graphite layer affected by LMD, and a thickness of LMD on the graphite layer. Quantification block 318 may include data relative to cells from which the diagnostic test data was obtained, i.e., the cell under test as well as cells sharing characteristics (e.g., identical) to the cell under test.

Determinations 308 may be based on one or both of sigmoidal analysis 306 and quantifications 318. For example, one or more of regression analysis block 304, TAA method block 310, correlation block 314, and continuity block 316 may produce determination 308 based, in part on sigmoidal analysis 306 and/or quantifications 318. Determinations 308 may include determinations regarding an LMD state of cells from which the diagnostic test data 302 was obtained. In particular, determinations 308 may include determinations specific to the cell under test. The determinations may include an LMD state, including e.g., an amount or degree of LMD affecting the cell or cells, a probability of cell failure or catastrophic cell failure, and/or a prediction regarding remaining life of the cell or cells. Additionally or alternatively, the determinations 308 can be used to identify potentially unsafe conditions caused by LMD, and project battery end of life, without limitation.

In some cases, it may be possible to observe LMD in the cell or cells. In these cases, observations 320 may be compared with the quantifications 318 to determine an accuracy of quantifications 318 (can compare to observed LMD). Such a comparison may result in refinements of one or more of regression analysis block 304, TAA method block 310, correlation block 314, and continuity block 316.

Figure 4:
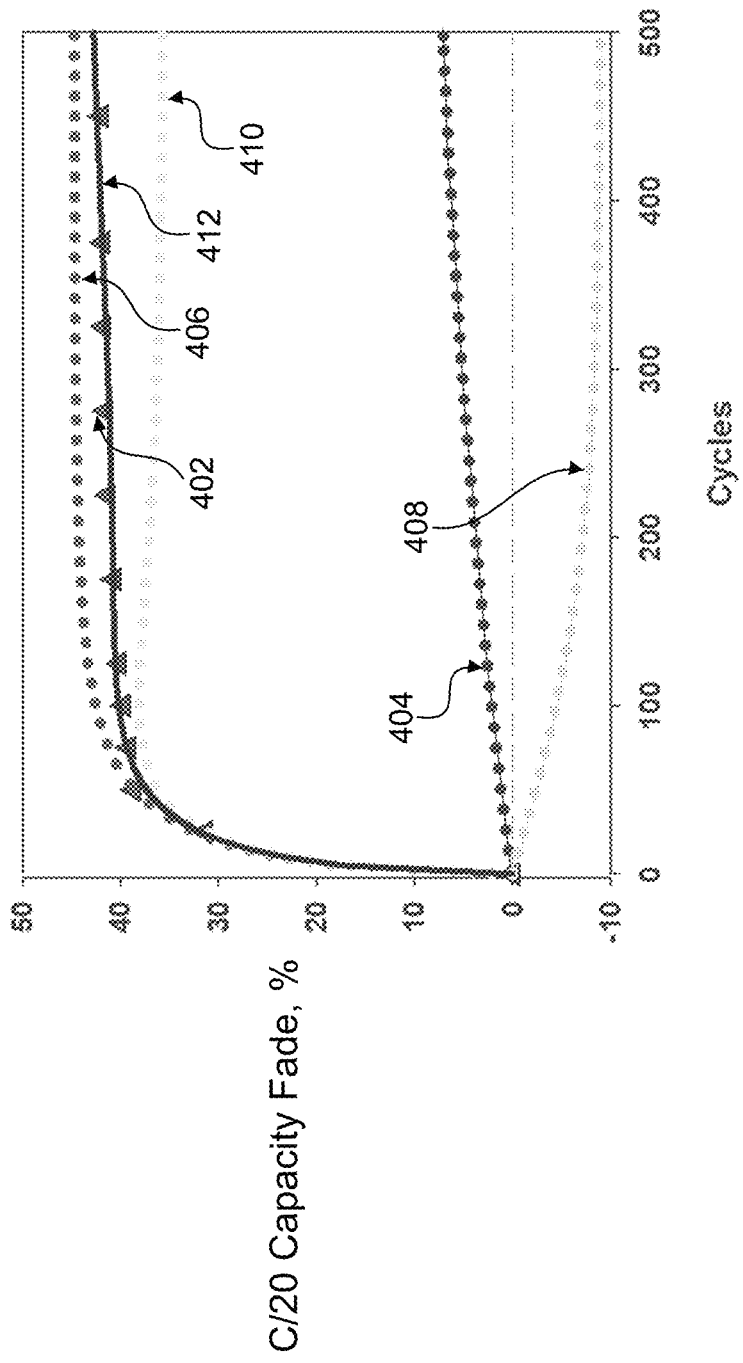
Figure 5:
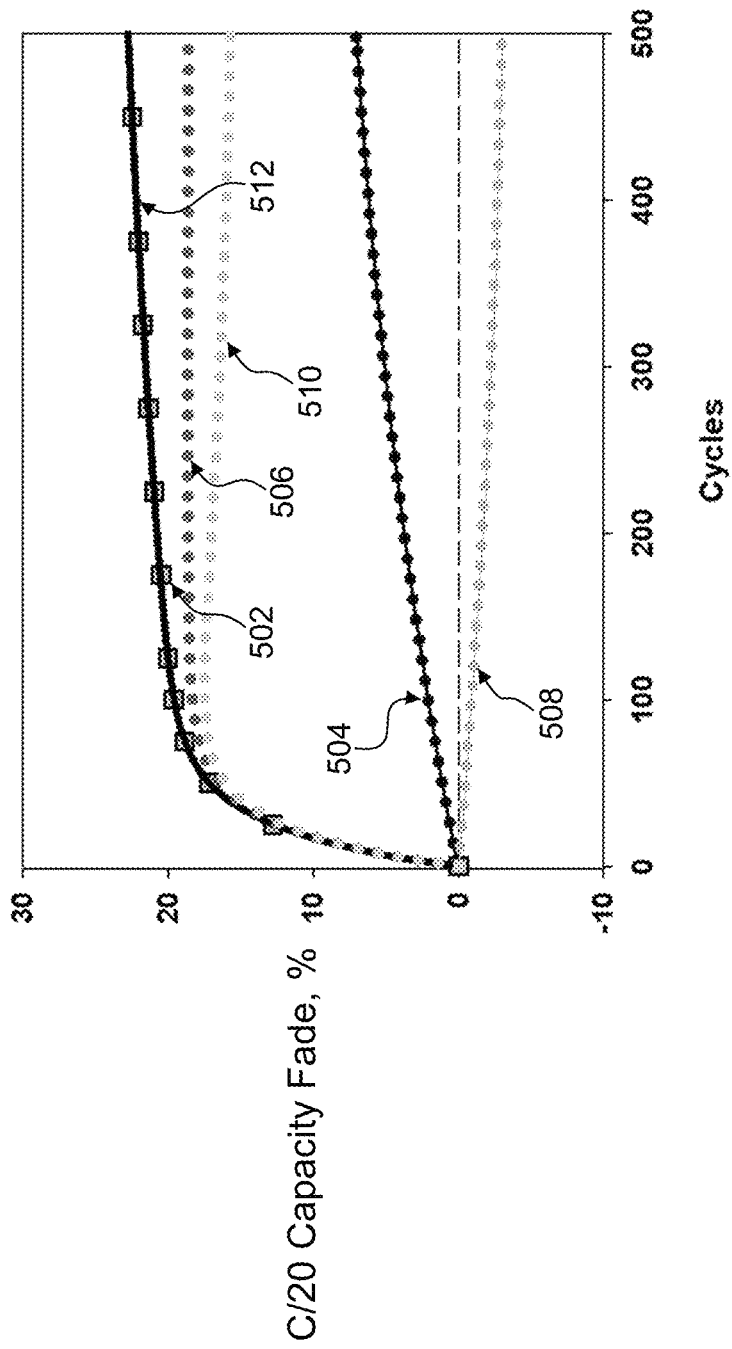
Figure 6:
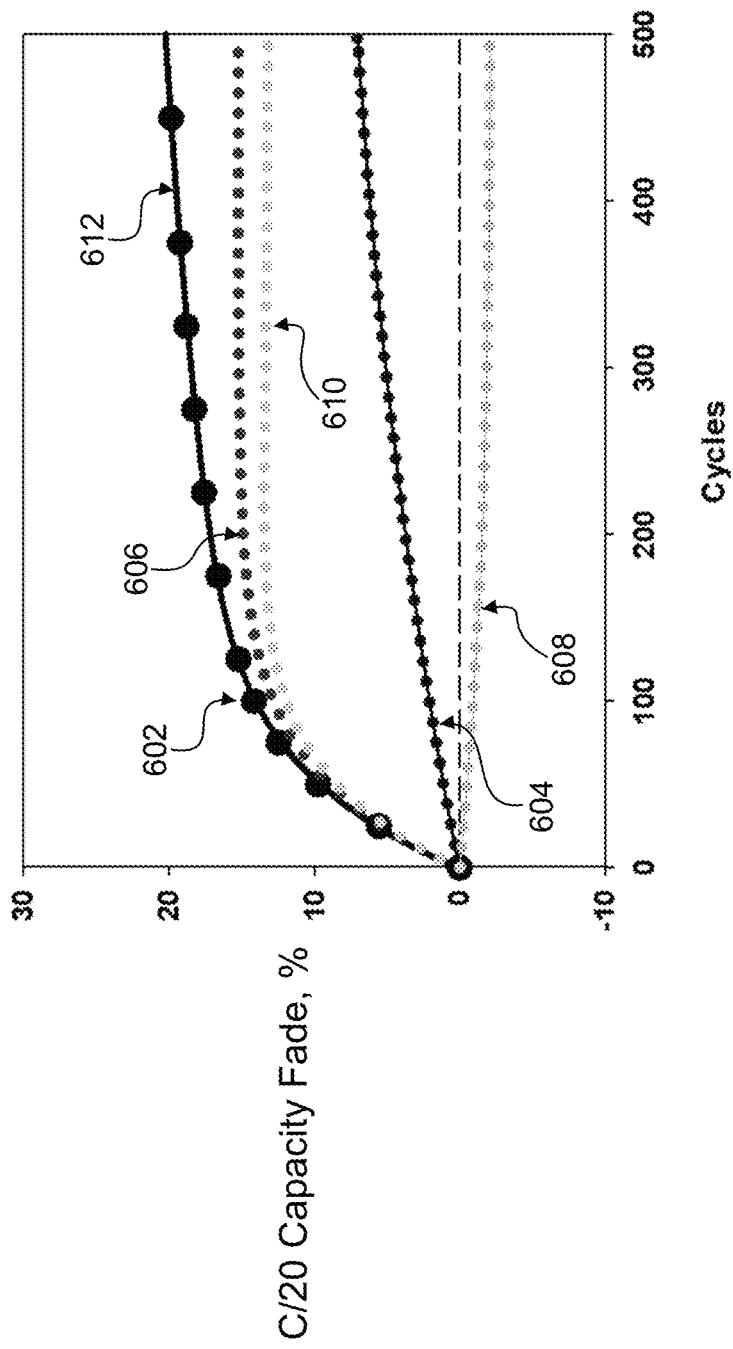
Figure 7:
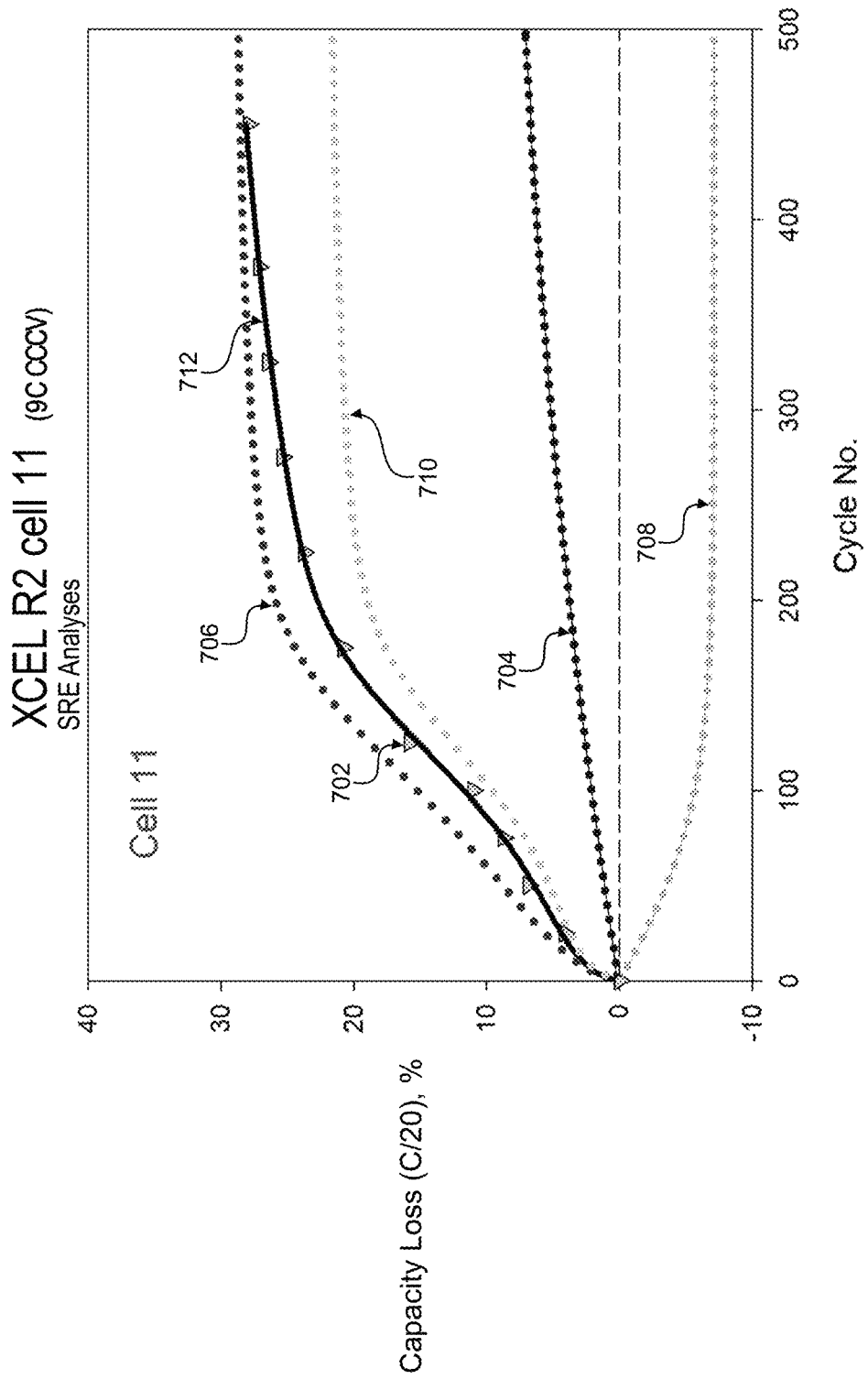

Each of FIGS. 4-7 is a graph illustrating capacity-fade data of a respective lithium-ion cell, the capacity-fade analysis data obtained according to one or more embodiments of the present disclosure. FIG. 4 illustrates results from an example using multiple SRE for one cell (XCEL cell 5) (at 6C CCCV cycling condition). FIG. 5 illustrates results from an example using multiple SRE from one cell (XCEL cell 6) (6C CCCV). FIG. 6 illustrates results from an example using multiple SRE for one cell (XCEL cell 4) (6C CCCV). FIG. 7 illustrates results from an example using multiple SRE for one cell (XCEL R2 cell 11) (9C CCCV). In the foregoing discussion, the cycling conditions are explained as follows: 6C CCCV refers to a condition whereby a cell is charged from empty to full in ⅙ hour (10 minutes) starting with a constant-current (CC) condition until maximum voltage is reached, whereafter a constant voltage (CV) condition is applied at the maximum battery voltage until the 10-minute charge time is elapsed.

Regarding procedure, capacity-fade data of Cell 16 was regressed first, then equation (1) was regressed to describe the aging of cells 4, 5, 6, and 11. Equation (1) is:

$$f = 2*9.65*(0.5 - 1/(1 + \exp((0.004*x)^{0.893}))) \ldots (\text{"Cell 16 baseline"})$$
$$+ 2*n*(0.5 - 1/(1 + \exp((c*x)^{0.5}))) \ldots (\text{"LMD"})$$
$$- 2*r*(0.5 - 1/(1 + \exp((s*x)^{1}))) \ldots (\text{"LMD dissipation"})$$

Where for Cell 5 (FIG. 4):
$R^2 = 0.9981$;
$n = 44.7438$;
$r = 9.0648$;
$c = 0.1357$; and
$s = 0.0107$.

The graphs of FIGS. 4-7 illustrate various data regarding the capacity fade of the cells (e.g., cells, 5, 6, 4, and 11). In particular, each of FIGS. 4-7 illustrates capacity fade expressions and/or data sets i.e., a degree of capacity loss of the cell since its first charge, as a function of charging modes and number of cycles.

Each of FIGS. 4-7 illustrates a measured capacity fade. In FIG. 4, measured capacity-fade data 402 of cell 5 is illustrated using triangles. In FIG. 5, measured capacity-fade data 502 of cell 6 is illustrated using squares. In FIG. 6, measured capacity-fade data 602 of cell 4 is illustrated using circles. In FIG. 7, measured capacity-fade data 702 of cell 11 is illustrated using inverted triangles. In FIGS. 4-7, the measured capacity fade is representative of real measured data. However, the measured capacity fade is illustrated as an example of data from a cell under test (e.g., diagnostic test data 302 of FIG. 3) that may be used by systems, methods, and/or devices of the present disclosure.

Additionally, each of FIGS. 4-7 illustrates a baseline capacity fade (e.g., of cell 16) as black dots connected by a line. Specifically, FIG. 4 illustrates baseline capacity fade 404, FIG. 5 illustrates baseline capacity fade 504, FIG. 6 illustrates baseline capacity fade 604, and FIG. 7 illustrates baseline capacity fade 704. The baseline capacity fade may be data from a model or expression e.g., from an SRE. Baseline capacity fade may be representative of expected capacity fade of the cell absent LMD. The baseline capacity fade may be an expression based on data from one or more cells similar or identical to the cell under test. The baseline capacity fade may be an example of the baseline expression of sigmoidal analysis 306 of FIG. 3.

Additionally, each of FIGS. 4-7 illustrates an LMD capacity fade as black dots. Specifically, FIG. 4 illustrates LMD capacity fade 406, FIG. 5 illustrates LMD capacity fade 506, FIG. 6 illustrates LMD capacity fade 606, and FIG. 7 illustrates LMD capacity fade 706. The LMD capacity fade may be data from a model or expression e.g., from an SRE. LMD capacity fade may be representative of expected capacity fade of the cell due to LMD. The LMD capacity fade may be an expression based on data from one or more cells similar or identical to the cell under test. The LMD capacity fade may be an example of the LMD expression of sigmoidal analysis 306 of FIG. 3.

Additionally, each of FIGS. 4-7 illustrates an LMD-dissipation capacity fade or LMD-reversal fade as light gray dots connected by a line. Specifically, FIG. 4 illustrates LMD-reversal fade 408, FIG. 5 illustrates LMD-reversal fade 508, FIG. 6 illustrates LMD-reversal fade 608, and FIG. 7 illustrates LMD-reversal fade 708. This is observed as a negative capacity loss (i.e., a capacity gain) from the reversal of a fraction of LMD to lithium ions or atoms. The LMD-dissipation capacity fade may be data from a model or expression e.g., from an SRE. LMD-dissipation capacity fade may be representative of expected capacity fade of the cell due to LMD being reversed. The LMD-dissipation capacity fade may be an expression based on data from one or more cells similar or identical to the cell under test. The LMD-dissipation capacity fade may be an example of the LMD-reversal expression of sigmoidal analysis 306 of FIG. 3.

Additionally, each of FIGS. 4-7 illustrates an adjusted LMD capacity fade or net LMD fade as light gray dots. Specifically, FIG. 4 illustrates net LMD fade 410, FIG. 5 illustrates net LMD fade 510, FIG. 6 illustrates net LMD fade 610, and FIG. 7 illustrates net LMD fade 710. The adjusted LMD capacity fade may be data from one or more models or expressions e.g., from one or more SREs. Adjusted LMD capacity fade may be representative of expected capacity fade of the cell due both LMD and LMD reversal i.e., the net effects of LMD. The adjusted LMD capacity fade may be an expression based on data from one or more cells similar or identical to the cell under test. The adjusted LMD capacity fade may be the sum of the LMD capacity fade and the LMD-dissipation capacity fade.

Additionally, each of FIGS. 4-7 illustrates a total capacity fade as a black line. Specifically, FIG. 4 illustrates total capacity fade 412, FIG. 5 illustrates total capacity fade 512, FIG. 6 illustrates total capacity fade 612, and FIG. 7 illustrates total capacity fade 712. The total capacity fade may be data from one or more models or expressions e.g., from one or more SREs. Total capacity fade may be representative of expected capacity fade of the cell due to all of LMD, LMD reversal, and baseline capacity fade i.e., the net effects of LMD and the baseline expected fade. The total capacity fade may be an expression based on data from two or more cells similar or identical to the cell under test. The total capacity fade may be the sum of the LMD capacity fade, the LMD-dissipation capacity fade, and the baseline fade.

Notable in FIGS. 4-7 is the correlation between the total fade (e.g., total capacity fade 412, 512, 612, and 712) (which are obtained from models or expressions) and the measured capacity fade (e.g., measured capacity-fade data 402, 502, 602, and 702). Thus, FIGS. 4-7 illustrate that, based on models and expression, e.g., as described herein, capacity fade due to LMD and other causes can be determined.

Also, notably, there is a strong correlation between LMD extent and initial unavailable fraction of anode as ascertained from TAA model. The LMD would include the trapped $LiC_6$ and $LiCi_2$ components.

FIG. 8 is a bar graph illustrating modeled data of fractions of capacity losses due to different causes, the modeled data obtained according to one or more embodiments of the present disclosure. In particular, bars of the bar graph of FIG. 8 illustrate fractions of capacity fade of a number of cells (cells numbered, from left to right, 16, 4, 6, 11, and 5) after 450 complete cycles. In particular, the bars include first fractions 802 of capacity fade resulting from irreversible LMD, second fractions 804 of capacity fade resulting from a solid electrolyte interface layer and/or cathode electrolyte interface layer, and third factions 806 of capacity loss resulting from trapped $LiC_6$ and $LiCi_2$.

The data illustrated in FIG. 8 was obtained from models. Notably, the results obtained from the models is similar to results obtained by interrogating cells using an X-ray diffraction technique. Some relevant Expressions are given here as equations 2 through 8.

Equation (2), describes moles Li in the topmost layer of graphite secondary particles (e.g., lithium trapped by LMD coverage):

$$\text{Moles}_{Li,Gr\text{-}top} = (1/M_{Li}) * (\rho_{Li,Gr} D_{Gr}) * (1 - \varepsilon_{void}) * L_{anode} * W_{anode} * f_{affected\ anode\ area}$$

Where:
$D_{Gr}$ is the average diameter of the anode secondary particles,
$M_{Li}$ is the molecular weight of lithium,
$\rho_{Li,Gr}$ is the density of lithium population in the anode graphite,
$\varepsilon_{void}$ is the anode graphite void fraction, and
L and W are the anode surface length and width, respectively.

Equation (3) describes moles in irreversible LMD layer of average thickness $D_{LMD}$:

$$\text{Moles}_{Li,LMD\ irreversible} = (1/M_{Li}) * (\rho_{Li,LMD} D_{LMD}) * (1 - \varepsilon_{void}) * L_{anode} * W_{anode} * f_{affected\ anode\ area}$$

$$\Psi_{Li,Gr\text{-}top} = \text{Moles}_{Li,Gr\text{-}top}/\text{Moles}_{Li,LMD\ irreversible} = x_{Li,Gr\text{-}top}/x_{Li,LMD\ irreversible} \quad \text{Equation (4):}$$

for mole fractions denoted as x.
This gives equation (5):

$$\Psi_{Li,Gr\text{-}top} = x_{Li,Gr\text{-}top}/x_{Li,LMD\ irreversible} = \rho_{Li,Gr} D_G / \rho_{Li,LMD} D_{LMD}$$

Equation (6) describes total Li moles irreversibly lost due to LMD consequences:

$$\text{Moles}_{Li,LMD\ related} = \text{Moles}_{LI,Gr\text{-}top} + \text{Moles}_{Li,LMD\ irreversible} = \ldots (1+\Psi_{Li,Gr\text{-}top}) * x_{Li,LMD\ irreversible}$$

Equation (7) describes the volume fraction of affected anode graphite host:

$$x_{Li,Gr\text{-}top}^V = \frac{D_{Gr} * A_{affected\ anode}}{D_{anode} * A_{anode,total}}$$

where:

$$x_{Li,Gr\text{-}top}^V = x_{Li,Gr\text{-}top}$$

Equation (8) describes the affected anode area:

$$A_{affected\ anode} = A_{LMD,BL} + \Delta A_{LMD,non\text{-}BL}$$

Assumptions:
$D_{Gr} = 6$ μm
$D_{anode} = 70$ μm
$\Psi_{Li,Gr\text{-}top} \approx 0.15$
Topmost layer of graphite secondary particles is trapped by LMD coverage.
LMD reversibility is assumed to occur mostly along the depth of the LMD.

Also contributing to these calculations are the series of SREs for each cell that describe the baseline SEI/CEI contribution, the maximum LMD, and the LMD dissipation, all over the cycle count.

FIG. 9 is a graph illustrating modeled data of capacity loss due to LMD as a function of fraction of unavailable anode surface, the modeled data obtained according to one or more embodiments of the present disclosure. In particular, FIG. 9 illustrates four data points obtained through TAA and SRE modeling as stars. The four data points, considered from left to right, correspond to cell 4, cell 6, cell 11, and cell 5. FIG. 9 also illustrates a plotted curve illustrating a generalized model. The generalized model is given as Equation (9):

$$LMD - LMD_0 = (1 - LMD_0 - SEI_0) * (x^{(\beta*(1-x))} - x_0^{(\beta*(1-x0))})$$

e.g., $(1 - 0.15 - 0.07) * (x^{\wedge}(\beta*(1-x)) - 0.01^{\wedge}(\beta*0.99))$
for $\beta = 1.7325$ (inverse Euler constant)
includes $LiC_6$ and $LiC_{12}$ trapped under LMD, possibly just one layer of secondary anode particles.

The exponent factor R might be a function of fraction unavailable surface, increasing over the span of unavailable surface, denoting a shift from 2D to 3D functionality. R may also be a function of cycling (charge) rate and/or $LMD_0$ should likely be a function of charge rate. $SEI_0$ may be a slight function of charge rate.

FIG. 10 is a graph illustrating evaluations of LMD models as a function of affected anode area and LMD dissipation, the LMD models according to one or more embodiments of the present disclosure. In particular, FIG. 10 illustrates an LMD data set, an LMD adjusted data set, and an LMD baseline data set with regard to (from left to right) cell 16, cell 4, cell 6, cell 11 and cell 5. Specifically, FIG. 10 illustrates a baseline LMD data point 1002A of cell 4, a first adjusted LMD data point 1004A (e.g., adjusted to account for dissipation along depth) of cell 4, and a second adjusted LMD data point 1006A (e.g., adjusted to account for dissipation along area) of cell 4. Similarly, FIG. 10 illustrates a baseline LMD data point 1002B of cell 6, a first adjusted LMD data point 1004B (e.g., adjusted to account for dissipation along depth) of cell 6, and a second adjusted LMD data point 1006B (e.g., adjusted to account for dissipation along area) of cell 6. Similarly, FIG. 10 illustrates a baseline LMD data point 1002C of cell 11, a first adjusted LMD data point 1004C (e.g., adjusted to account for dissipation along depth) of cell 11, and a second adjusted LMD data point 1006C (e.g., adjusted to account for dissipation along area) of cell 11. Similarly, FIG. 10 illustrates a baseline LMD data point 1002D of cell 5, a first adjusted LMD data point 1004D (e.g., adjusted to account for dissipation along depth) of cell 5, and a second adjusted LMD data point 1006D (e.g., adjusted to account for dissipation along area) of cell 5.

Another approach to assessing the fraction of LMD-affected anode area is to start with the $LMD_{max}$ (pre-dissipation) from the sigmoidal rate expression (SRE) analyses, then assume dissipation along LMD depth. This gives trends for LMD area coverage that are very close to actual observations.

One corresponding uncertainty is whether reversible (dissipated) LMD occurs along LMD depth, or whether it does so by decreasing LMD area. Although the model shows both modes, the depth mode appears more plausible for reversible LMD. There may be a decreased depth of LMD following the reversibility stage. Both modes (the depth mode and the area mode) can contribute during LMD dissipation, but perhaps at different levels.

These results enable prediction of how much visual LMD would appear (as a fraction of area) on a harvested anode, given the fraction of capacity that is LMD. Conversely, the LMD-related capacity loss quantities can be estimated based on the visual LMD coverage.

FIG. 11 illustrates modeled data indicative of depth (thickness) of LMD on an anode, the modeled data obtained according to one or more embodiments of the present disclosure. The modeled data illustrates a relationship between depth of the anode affected by LMD (or LMD thickness) and a fraction of the surface of the anode affected by LMD. These results are based on the assumption that LMD dissipation (diffusive intake of Li ions or atoms from LMD into the graphite) occurs along the depth coordinate of the anode. FIG. 11 illustrates a depth of trapped graphite 1102A of cell 4, a depth of irreversible LMD 1104A of cell 4, and total LMD 1106A of cell 4. Similarly, FIG. 11 illustrates a depth of trapped graphite 1102B of cell 6, a depth of irreversible LMD 1104B of cell 6, and total LMD 1106B of cell 6. FIG. 11 illustrates a depth of trapped graphite 1102C of cell 11, a depth of irreversible LMD 1104C of cell 11, and total LMD 1106C of cell 11. FIG. 11 illustrates a depth of trapped graphite 1102D of cell 5, a depth of irreversible LMD 1104D of cell 5, and total LMD 1106D of cell 5.

FIG. 12A illustrates a relationship between predicted fraction of LMD coverage and observed fraction of LMD coverage, the predicted fraction of LMD coverage obtained according to one or more embodiments of the present disclosure, the observed fraction of LMD coverage as observed using photographic analysis. Specifically, FIG. 12A illustrates a relationship between a predicted fraction of LMD coverage and an observed fraction of LMD coverage of cell 16 at point 1202, a relationship between a predicted fraction of LMD coverage and an observed fraction of LMD coverage of cell 4 at point 1204, a relationship between a predicted fraction of LMD coverage and an observed fraction of LMD coverage of cell 6 at point 1206, a relationship between a predicted fraction of LMD coverage and an observed fraction of LMD coverage of cell 11 at point 1208, and a relationship between a predicted fraction of LMD coverage and an observed fraction of LMD coverage of cell 5 at point 1210.

FIG. 12B includes images of the cells (cell 4, cell 5, cell 6, cell 11, and cell 16), the cells exhibiting LMD. The images were obtained using photographic analysis.

FIG. 13 is a flowchart of an example method 1300, in accordance with various embodiments of the disclosure. At least a portion of method 1300 may be performed, in some embodiments, by a device or system, such as device 1600 of FIG. 16, battery-management system 1604 of FIG. 16, device 1700 of FIG. 17, or another device or system. Although illustrated as discrete blocks, various blocks may be divided into additional blocks, combined into fewer blocks, or eliminated, depending on the desired implementation.

At block 1302, charge states of a lithium-ion battery may be measured over a number of charging cycles. The charge states of the lithium-ion battery may be indicative of a capacity of the lithium-ion battery. Any of: the measured capacity-fade data of cell 5 ("Cell 5 data") illustrated in FIG. 4 using triangles, the measured capacity-fade data of cell 6 ("Cell 6 data") illustrated in FIG. 5 using squares, the measured capacity-fade data of cell 4 ("Cell 4 data") illustrated if FIG. 6 using circles, the measured capacity-fade data of cell 11 ("Cell 11 data") illustrated in FIG. 7 using inverted triangles may be an example of charge states measured at block 1302.

At block 1304, an expression for lithium-metal-deposition-based (LMD-based) capacity fade may be obtained. Any of the "baseline (SEI)+LMD-LMD dissipation" lines illustrated in FIGS. 4-7 using solid lines may be an example of data derived from an expression, e.g., the obtained at block 1304. The expression obtained at block 1304 may have been generated through a method process similar to or the same as method 1500 of FIG. 15.

At block 1306, an LMD state of the lithium-ion battery may be determined based on a comparison between the measured charge states and the expression. For example, based on a correlation between the capacity-fade data measured at block 1302 and data derived from the expression obtained at block 1304, an LMD state of the lithium-ion battery maybe determined. In some embodiments, the LMD state of the lithium-ion battery may be determined or updated one or more times, e.g., as one or more additional charge states are observed and/or measured. In some embodiments, method 1300, including block 1306, may be performed on a battery while the battery is in use. In some embodiments, the LMD state of the lithium-ion data may be determined based on data samples that have been measured and/or recorded previously. In other words, LMD states of batteries of historical data sets may be analyzed and/or determined.

At block 1308, a potentially unsafe condition of the lithium-ion battery may be identified based on the LMD state.

At block 1310, a probability of a failure of the lithium-ion battery may be determined based on the LMD state.

At block 1312, an end of life of the lithium-ion battery may be predicted based on the LMD state.

At block 1314, a charging profile of the lithium-ion battery may be adjusted based on the LMD state. Additionally or alternatively, the lithium-ion battery may be charged based on the charging profile.

At block 1316, a recommendation indicative of charging instructions for the lithium-ion battery may be generated. The recommendation may be based on the LMD state.

At block 1318, the lithium-ion battery may be retired based on the LMD state.

At block 1320, the lithium-ion battery may be isolated based on the LMD state.

FIG. 14 is a flowchart of an example method 1400, in accordance with various embodiments of the disclosure. At least a portion of method 1400 may be performed, in some embodiments, by a device or system, such as device 1600 of FIG. 16, battery-management system 1604 of FIG. 16, device 1700 of FIG. 17, or another device or system. Although illustrated as discrete blocks, various blocks may be divided into additional blocks, combined into fewer blocks, or eliminated, depending on the desired implementation.

At block 1402, data samples indicative of capacity of a battery over a number of complete cycles may be obtained. The charge states of the battery may be indicative of a capacity of the lithium-ion battery. Any of: the measured capacity-fade data of cell 5 ("Cell 5 data") illustrated in FIG. 4 using triangles, the measured capacity-fade data of cell 6 ("Cell 6 data") illustrated in FIG. 5 using squares, the measured capacity-fade data of cell 4 ("Cell 4 data") illustrated if FIG. 6 using circles, the measured capacity-fade data of cell 11 ("Cell 11 data") illustrated in FIG. 7 using inverted triangles may be an example of data samples measured at block 1402.

At block 1404, charging data indicative of conditions of the number of complete cycles may be obtained.

At block 1406, an expression for LMD-based capacity fade may be obtained. Any of the "baseline (SEI)+LMD-LMD dissipation" lines illustrated in FIGS. 4-7 using solid lines may be an example of data derived from an expression, e.g., obtained at block 1406. The expression obtained at block 1406 may have been generated through a method process similar to or the same as method 1500 of FIG. 15.

At block 1408, an LMD state of the battery may be determined based on a comparison between the data samples, the charging data, and the expression. For example, based on a correlation between the data samples obtained at block 1402, the charging data obtained at block 1406, and data derived from the expression obtained at block 1406, an LMD state of the lithium-ion battery maybe determined. In some embodiments, the LMD state of the lithium-ion battery may be determined or updated one or more times, e.g., as one or more additional charge states are observed and/or measured. In some embodiments, method 1400, including block 1408, may be performed on a battery while the battery is in use. In some embodiments, the LMD state of the lithium-ion data may be determined based on data samples that have been measured and/or recorded previously. In other words, LMD states of batteries of historical data sets may be analyzed and/or determined.

At block 1410, a potentially unsafe condition of the battery may be identified based on the LMD state.

At block 1412, a probability of a failure of the battery may be determined based on the LMD state.

At block 1414, an end of life of the battery may be predicted based on the LMD state.

At block 1416, a charging profile of the battery may be adjusted based on the LMD state. Additionally or alternatively, the lithium-ion battery may be charged based on the charging profile.

At block 1418, a recommendation indicative of charging instructions for the battery may be generated. The recommendation may be based on the LMD state.

At block 1420, the battery may be retired based on the LMD state.

At block 1422, the battery may be isolated based on the LMD state.

FIG. 15 is a flowchart of an example method 1500, in accordance with various embodiments of the disclosure. At least a portion of method 1500 may be performed, in some embodiments, by a device or system, such as device 1700 of FIG. 17, or another device or system. Although illustrated as discrete blocks, various blocks may be divided into additional blocks, combined into fewer blocks, or eliminated, depending on the desired implementation.

At block 1502, a baseline capacity-loss data set for a battery may be obtained. "Baseline" data points represented by black circles connected by lines in FIGS. 4-7 may be examples of baseline-capacity loss data obtained at block 1502.

At block 1504, based on the baseline capacity-loss data set, a first expression for baseline capacity loss may be generated. For example, a regression may be performed on the data obtained at block 1502 to generate a sigmoidal rate expression for the baseline data.

At block 1506, an LMD-based capacity-loss data set representative of LMD in the battery may be obtained. "LMD" data points represented by black circles in FIGS. 4-7 may be examples of LMD-based capacity-loss data obtained at block 1506. Alternatively, "adjusted LMD (minus dissipation)" data points represented by light gray circles in FIGS. 4-7 may be examples of the LMD-based capacity-loss data obtained at block 1506. The LMD-based capacity-loss data may be, or may include, data obtained at non-baseline conditions that may include at least one LMD element.

At block 1508, based on the LMD-based capacity-loss data set, a second expression for LMD-based capacity loss may be generated. For example, a regression may be performed on the data obtained at block 1506 to generate a sigmoidal rate expression for the data.

At block 1510, based on the first expression and the second expression, a third expression indicative of total capacity loss for the battery may be generated. The "Baseline (SEI)+LMD-LMD dissipation" data points illustrated by black lines in FIGS. 4-7 may be examples of data points derived from the third expression generated at block 1510. The third expression may be a sigmoidal rate expression representing baseline capacity loss and LMD-based capacity loss. The third expression generated at block 1510 may be the same as or substantially to the expression obtained at block 1304 of method 1300 of FIG. 13 and/or the expression obtained at block 1406 or method 1400 of FIG. 14.

At block 1512, the second expression may be generated based on: a fourth expression indicative of capacity loss due to LMD and a fifth expression indicative of capacity gain due to LMD reversal. For example, in cases in which the "adjusted LMD (minus dissipation)" data points represented by light gray circles in FIGS. 4-7 are examples of the LMD-based capacity-loss data obtained at block 1506, the "LMD" data points represented by black circles in FIGS. 4-7 may be examples of data points derived from the fourth expression of block 1512 and the "LMD Dissipation" data points represented by gray circles connected by gray lines in FIGS. 4-7 may be examples of data points derived from the fifth expression of block 1512.

At block 1514, the third expression may be generated further based on one or more of: a first model indicative of a fraction of capacity loss attributable to LMD for the battery, a second model indicative of both reversible LMD in the battery and irreversible LMD in the battery, a third model indicative of one or more of: a surface area of an anode of the battery that is affected by LMD and a depth of the anode affected by LMD, a fourth model indicative of one or more of: a surface area of a graphite layer of the lithium-ion battery that is affected by LMD and a depth of the graphite layer affected by LMD, on a lithium-mass-continuity expression, and an analysis of changes that occur in the battery over time as a result of discrete interactions in the battery. FIG. 8 illustrates data indicative of a fraction of capacity loss attributable to LMD which may be the basis for the first model of block 1514. FIG. 9, FIG. 10, and FIG. 11 illustrate data indicative of a fraction of capacity loss attributable to LMD which may be the basis for the third model of block 1514.

Modifications, additions, or omissions may be made to any of method 1300 of FIG. 13, method 1400 of FIG. 14, method 1500 of FIG. 15, without departing from the scope of the present disclosure. For example, the operations of method 1300 of FIG. 13, method 1400 of FIG. 14, and/or method 1500 of FIG. 15, may be implemented in differing order. Furthermore, the outlined operations and actions are only provided as examples, and some of the operations and actions may be optional, combined into fewer operations and actions, or expanded into additional operations and actions without detracting from the essence of the disclosed example.

FIG. 16 is a block diagram of an example device 1600 that, in various embodiments, may be used to implement various functions, operations, acts, processes, and/or methods disclosed herein.

Device 1600 includes a lithium-ion battery 1602 and a battery-management system 1604. Battery-management system 1604 may be configured to manage usage and/or charging of lithium-ion battery 1602.

In some embodiments, battery-management system 1604 may be configured to measure charge states of lithium-ion battery 1602 over a number of charging cycles. Additionally or alternatively, battery-management system 1604 may be configured to obtain an expression for lithium-metal-deposition-based (LMD-based) capacity fade. Additionally or alternatively, battery-management system 1604 may be configured to determine an LMD state of lithium-ion battery 1602 based on a comparison between the measured charge states and the expression.

In some embodiments, battery-management system 1604 may be configured to obtain data samples indicative of capacity of a battery (e.g., lithium-ion battery 1602) over a number of complete cycles. Additionally or alternatively, battery-management system 1604 may be configured to obtain charging data indicative of conditions of the number of complete cycles. Additionally or alternatively, battery-management system 1604 may be configured to obtain an expression for LMD-based capacity fade. Additionally or alternatively, battery-management system 1604 may be configured to determine an LMD state of the battery based on a comparison between the data samples, the charging data, and the expression.

FIG. 17 is a block diagram of an example device 1700 that, in various embodiments, may be used to implement various functions, operations, acts, processes, and/or methods disclosed herein. Device 1700 includes one or more processors 1702 (sometimes referred to herein as "processors 1702") operably coupled to one or more apparatuses such as data storage devices (sometimes referred to herein as "storage 1704"), without limitation. Storage 1704 includes machine executable code 1706 stored thereon (e.g., stored on a computer-readable memory) and processors 1702 include logic circuitry 1708. Machine executable code 1706 include information describing functional elements that may be implemented by (e.g., performed by) logic circuitry 1708. Logic circuitry 1708 is adapted to implement (e.g., perform) the functional elements described by machine executable code 1706. Device 1700, when executing the functional elements described by machine executable code 1706, should be considered as special purpose hardware configured for carrying out the functional elements disclosed herein. In various embodiments, processors 1702 may be configured to perform the functional elements described by machine executable code 1706 sequentially, concurrently (e.g., on one or more different hardware platforms), or in one or more parallel process streams.

When implemented by logic circuitry 1708 of processors 1702, machine executable code 1706 is configured to adapt processors 1702 to perform operations of embodiments disclosed herein. For example, machine executable code 1706 may be configured to adapt processors 1702 to perform at least a portion or a totality of method 1300 of FIG. 13, method 1400 of FIG. 14, and/or method 1500 of FIG. 15. As another example, machine executable code 1706 may be configured to adapt processors 1702 to perform at least a portion or a totality of the operations discussed for device 1600 of FIG. 16 and/or battery-management system 1604 of FIG. 16.

Processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, processors 1702 may include any conventional processor, controller, microcontroller, or state machine. Processors 1702 may also be implemented as a combination of computing devices, such as a combination of a DSP and a microprocessor, a plurality of microprocessors, one or more microprocessors in conjunction with a DSP core, or any other such configuration.

In some embodiments, storage 1704 includes volatile data storage (e.g., random-access memory (RAM)), non-volatile data storage (e.g., Flash memory, a hard disc drive, a solid state drive, erasable programmable read-only memory (EPROM), without limitation). In some embodiments processors 1702 and storage 1704 may be implemented into a single device (e.g., a semiconductor device product, a system on chip (SOC), without limitation). In some embodiments processors 1702 and storage 1704 may be implemented into separate devices.

In some embodiments, machine executable code 1706 may include computer-readable instructions (e.g., software code, firmware code). By way of non-limiting example, the computer-readable instructions may be stored by storage 1704, accessed directly by processors 1702, and executed by processors 1702 using at least logic circuitry 1708. Also by way of non-limiting example, the computer-readable instructions may be stored on storage 1704, transmitted to a memory device (not shown) for execution, and executed by processors 1702 using at least logic circuitry 1708. Accordingly, in some embodiments, logic circuitry 1708 includes electrically configurable logic circuitry.

In some embodiments, machine executable code 1706 may describe hardware (e.g., circuitry) to be implemented in logic circuitry 1708 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments machine executable code 1706 may include an HDL, an RTL, a GL description, a mask level description, other hardware description, or any combination thereof.

In some embodiments, where machine executable code 1706 includes a hardware description (at any level of abstraction), a system (not shown, but including storage 1704) may be configured to implement the hardware description described by machine executable code 1706. By way of non-limiting example, processors 1702 may include a programmable logic device (e.g., an FPGA or a PLC) and the logic circuitry 1708 may be electrically controlled to implement circuitry corresponding to the hardware description into logic circuitry 1708. Also by way of non-limiting example, logic circuitry 1708 may include hard-wired logic manufactured by a manufacturing system (not shown, but including storage 1704) according to the hardware description of machine executable code 1706.

Regardless of whether machine executable code 1706 includes computer-readable instructions or a hardware description, logic circuitry 1708 is adapted to perform the functional elements described by machine executable code 1706 when implementing the functional elements of machine executable code 1706. It is noted that although a hardware description may not directly describe functional elements, a hardware description indirectly describes functional elements that the hardware elements described by the hardware description are capable of performing.

Although the context of embodiments of the present disclosure is described as generally applying to a battery, and in particular, a lithium-ion battery and/or a lithium-metal battery, the present disclosure is not to be viewed as so limited. For example, it is contemplated that the methodology described herein may be used in estimating aging consequences of arbitrary aging conditions for objects in the field of electronics or electrochemistry.

In the present disclosure, the terms "battery," "cell," and "cells" include one or more cells that produces electric energy including e.g., a lithium-ion-battery cell and/or a lithium-metal-battery cell. In some embodiments, a battery may include rechargeable cells, fuel cells, and other cells that use an electrochemical reaction to produce electric energy, and combinations thereof. In addition, although batteries having lithium-ion cells are primarily discussed herein, other types of batteries may be used and analyzed according to embodiments of the present disclosure.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads). While some of the devices, systems, and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to some embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated some embodiments, those of ordinary skill in the art will recognize and appreciate that the present invention is not so limited. Rather, many additions, deletions, and modifications to the illustrated and described some embodiments may be made without departing from the scope of the invention as hereinafter claimed along with their legal equivalents. In addition, features from one some embodiment may be combined with features of another some embodiment while still being encompassed within the scope of the invention as contemplated by the inventor.

What is claimed is:

1. A device comprising:
   a lithium-ion battery; and
   a battery-management system configured to:
      measure charge states of the lithium-ion battery over a number of charging cycles;
      obtain a first expression for lithium-metal-deposition (LMD)-based capacity fade, the first expression based at least on a second expression indicative of total non-LMD-based capacity loss and a third expression indicative of total capacity loss due to LMD; and
      determine an LMD state of the lithium-ion battery responsive to a comparison between the measured charge states and the first expression.

2. The device of claim 1, wherein the battery-management system is further configured to identify and warn a user of a potentially unsafe condition of the lithium-ion battery responsive to the determined LMD state.

3. The device of claim 1, wherein the battery-management system is further configured to estimate a capacity of the lithium-ion battery responsive to LMD state.

4. The device of claim 1, wherein the first expression comprises a first sigmoidal rate expression the second expression comprises a second sigmoidal rate expression, and the third expression comprises a third sigmoidal rate expression indicative of total capacity loss due to LMD.

5. A method of generating an expression for lithium-metal-deposition (LMD)-based capacity fade in a battery, the method comprising:
   obtaining a baseline capacity-loss data set for a battery;
   responsive to the baseline capacity-loss data set, generating a first expression for baseline capacity loss;
   obtaining an LMD-based capacity-loss data set representative of LMD in the battery;
   responsive to the LMD-based capacity-loss data set, generating a second expression for LMD-based capacity loss; and
   responsive to the first expression and the second expression, generating a third expression indicative of total capacity loss for the battery.

6. The method of claim 5, wherein the first expression is a first sigmoidal rate expression, the second expression is a second sigmoidal rate expression, and the third expression is a third sigmoidal rate expression.

7. The method of claim 6, wherein:
   the first sigmoidal rate expression is indicative of total non-LMD-based capacity loss.

8. The method of claim 7, wherein obtaining the second sigmoidal rate expression comprises generating the second sigmoidal rate expression based at least on:
   a fourth sigmoidal rate expression indicative of capacity loss due to LMD; and
   a fifth sigmoidal rate expression indicative of capacity gain due to LMD reversal.

9. The method of claim 5, wherein generating the third expression further comprises generating the third expression further based at least on a model indicative of a fraction of capacity loss attributable to LMD for the battery.

10. The method of claim 5, wherein generating the third expression further comprises generating the third expression further based at least on a model indicative of both reversible LMD in the battery and irreversible LMD in the battery.

11. The method of claim 5, generating the third expression further comprises generating the third expression further based at least on a model indicative of a surface area of an anode of the battery that is affected by LMD.

12. The method of claim 11, wherein the model is further indicative of a depth of the anode affected by LMD.

13. The method of claim 5, wherein generating the third expression further comprises generating the third expression further based at least on a model indicative of a surface area of a graphite layer of a lithium-ion battery that is affected by LMD.

14. The method of claim 13, wherein the model is further indicative of a depth of the graphite layer affected by LMD.

15. The method of claim 5, wherein generating the third expression further comprises generating the third expression further based at least on a lithium-mass-continuity expression.

16. The method of claim 5, wherein generating the third expression further comprises generating the third expression further based at least on an analysis of changes that occur in the battery over time as a result of discrete interactions in the battery.

17. The method of claim 5, further comprising:
   obtaining data samples indicative of capacity of a battery-in-use over a number of complete cycles; and
   determining an LMD state of the battery-in-use responsive to a comparison between the data samples and the third expression.

18. The method of claim 17, further comprising one or more of:
   identifying a potentially unsafe condition of the battery-in-use responsive to the LMD state;
   determining a probability of a failure of the battery-in-use responsive to the LMD state;
   predicting an end of life of the battery-in-use responsive to the LMD state;
   adjusting a charging profile of the battery-in-use responsive to the LMD state;

generating a recommendation indicative of charging instructions for the battery-in-use, the recommendation responsive to the LMD state;
retiring the battery-in-use responsive to the LMD state; or
isolating the battery-in-use responsive to the LMD state.

19. A method comprising:
obtaining data samples indicative of capacity of a battery over a number of complete cycles;
obtaining charging data indicative of conditions of the number of complete cycles;
obtaining a first expression for lithium-metal-deposition (LMD)-based capacity fade, the first expression based at least on a second expression indicative of total non-LMD-based capacity loss and a third expression indicative of total capacity loss due to LMD; and
determining an LMD state of the battery responsive to a comparison between the data samples, the charging data, and the first expression.

20. The method of claim 19, further comprising:
identifying a potentially unsafe condition of lithium dendrite formation on the battery responsive to the LMD state; and
warning a user of the potentially unsafe condition.

* * * * *